US011977373B2

(12) United States Patent
Nozuki et al.

(10) Patent No.: US 11,977,373 B2
(45) Date of Patent: May 7, 2024

(54) ABNORMALITY DIAGNOSIS METHOD, ABNORMALITY DIAGNOSIS DEVICE AND NON-TRANSITORY COMPUTER READABLE STORAGE MEDIUM

(71) Applicant: Mitsubishi Electric Corporation, Tokyo (JP)

(72) Inventors: Misa Nozuki, Tokyo (JP); Shinsuke Miki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 167 days.

(21) Appl. No.: 17/620,746

(22) PCT Filed: Apr. 28, 2020

(86) PCT No.: PCT/JP2020/018135
§ 371 (c)(1),
(2) Date: Dec. 20, 2021

(87) PCT Pub. No.: WO2021/019857
PCT Pub. Date: Feb. 4, 2021

(65) Prior Publication Data
US 2022/0413478 A1    Dec. 29, 2022

(30) Foreign Application Priority Data

Aug. 1, 2019    (WO) .................. PCT/JP2019/030206

(51) Int. Cl.
*G05B 23/02* (2006.01)
*G06F 18/22* (2023.01)

(52) U.S. Cl.
CPC ........... *G05B 23/024* (2013.01); *G06F 18/22* (2023.01)

(58) Field of Classification Search
CPC .............................. G05B 23/024; G06F 18/22
(Continued)

(56) References Cited

U.S. PATENT DOCUMENTS 11,002,640 B2 * 5/2021 Kubo ................. G05B 23/0221
11,315,812 B2 * 4/2022 Fujikata ............ H01L 21/67057
(Continued)

FOREIGN PATENT DOCUMENTS

JP        5345180 B2    11/2013
JP     2016-18435 A     2/2016
(Continued)

OTHER PUBLICATIONS

International Search Report and Written Opinion dated Jul. 21, 2020, received for PCT Application PCT/JP2020/018135, Filed on Apr. 28, 2020, 9 pages including English Translation.
(Continued)

*Primary Examiner* — Aditya S Bhat
(74) *Attorney, Agent, or Firm* — XSENSUS LLP

(57) ABSTRACT

An abnormality diagnosis method for diagnosing an abnormality in operational state of a diagnosis subject includes creating a unit space from normal operation data of the diagnosis subject, the unit space serving as a reference for determining the operational state of the diagnosis subject, acquiring data having state quantities of a plurality of evaluation items from the diagnosis subject, calculating a Mahalanobis distance of the data acquired, using the unit space created, and determining an abnormality in the operational state of the diagnosis subject based on the Mahalanobis distance calculated. The creating a unit space includes creating a plurality of unit spaces having mutually different data lengths The calculating a Mahalanobis distance includes calculating a plurality of Mahalanobis distances using the plurality of unit spaces created. The determining an abnormality includes determining an abnormality based on the plurality of Mahalanobis distances calculated.

33 Claims, 18 Drawing Sheets

(58) Field of Classification Search
USPC .......................................................... 702/183
See application file for complete search history.

(56) References Cited

U.S. PATENT DOCUMENTS

| | | |
|---|---|---|
| 2010/0198555 A1 | 8/2010 | Takahama et al. |
| 2014/0278237 A1 | 9/2014 | Takahama et al. |
| 2017/0201412 A1 | 7/2017 | Yano et al. |
| 2018/0275631 A1* | 9/2018 | Kitamura ................ G05B 23/02 |
| 2019/0018402 A1 | 1/2019 | Enomoto et al. |

FOREIGN PATENT DOCUMENTS

| | | |
|---|---|---|
| JP | 2016-91417 A | 5/2016 |
| JP | 2017-120504 A | 7/2017 |
| JP | 2017-123124 A | 7/2017 |
| WO | 2009/107805 A1 | 9/2009 |
| WO | 2021/220358 A1 | 11/2021 |

OTHER PUBLICATIONS

International Search Report and Written Opinion dated Oct. 8, 2019, received for PCT Application PCT/JP2019/030206, Filed on Aug. 1, 2019, 9 pages including English Translation.
Office Action dated Apr. 30, 2021, received for Taiwan Application 109124904, 14 pages including English Translation.

* cited by examiner

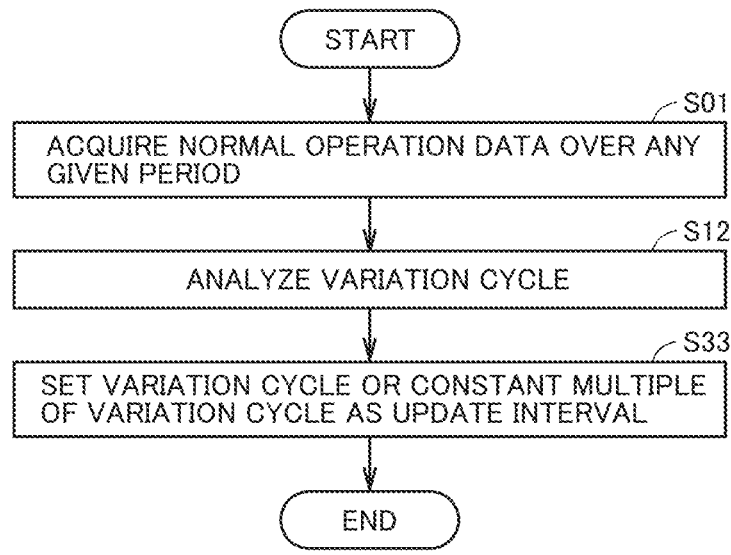
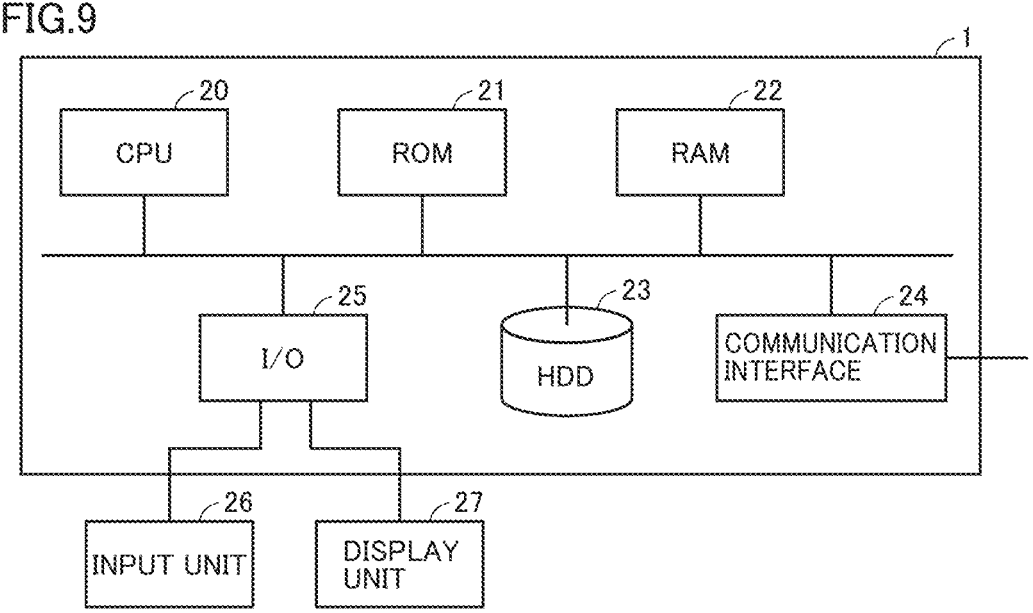

FIG.10
(A)
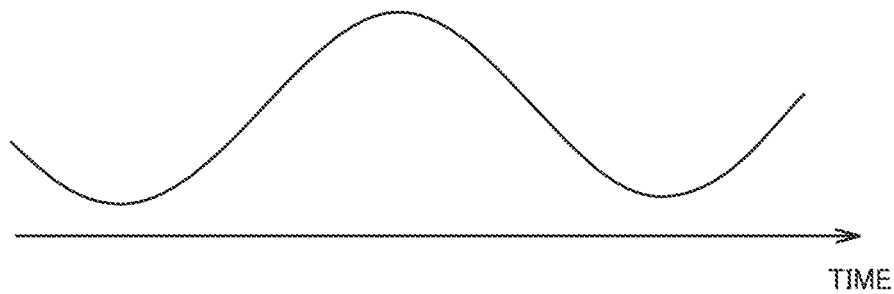
(B)
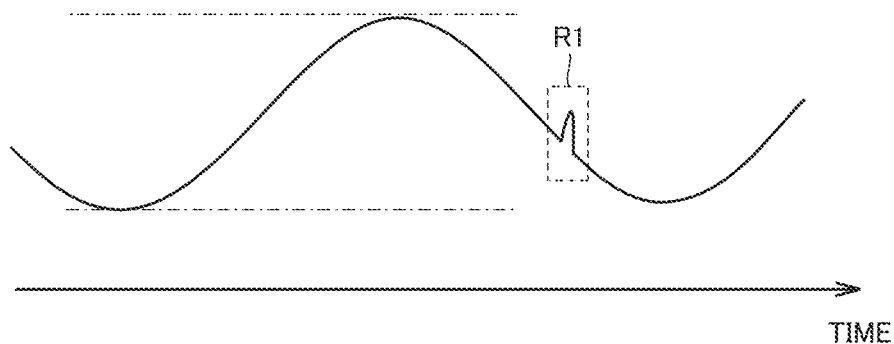
(C)
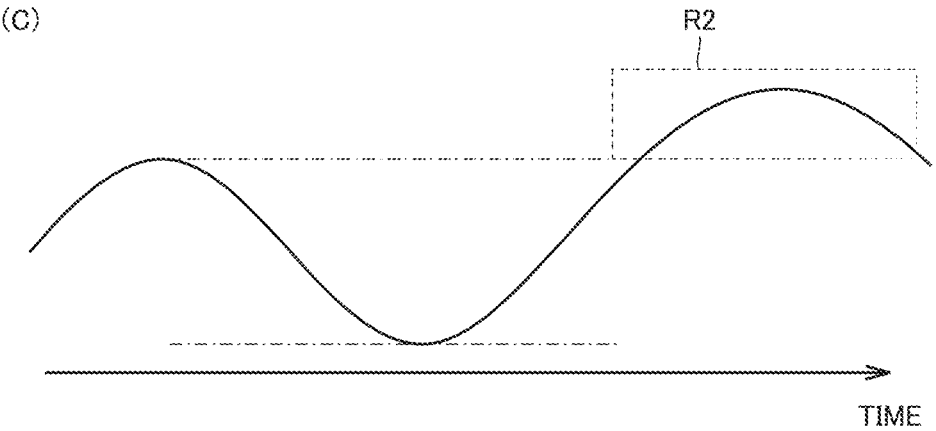

FIG.11
(A)
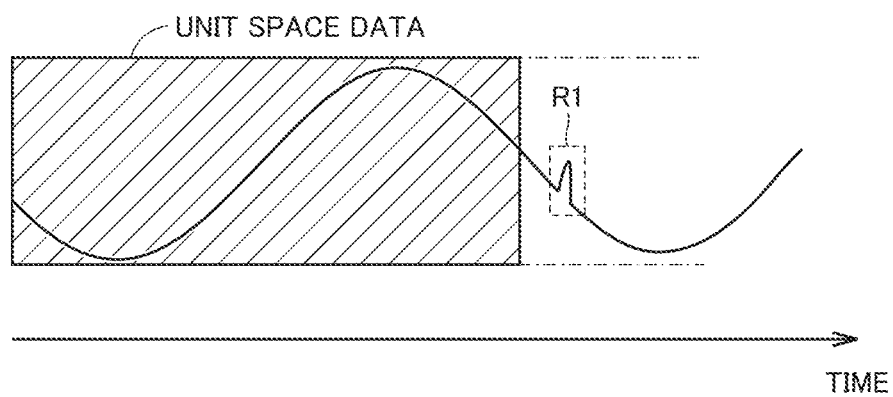
(B)
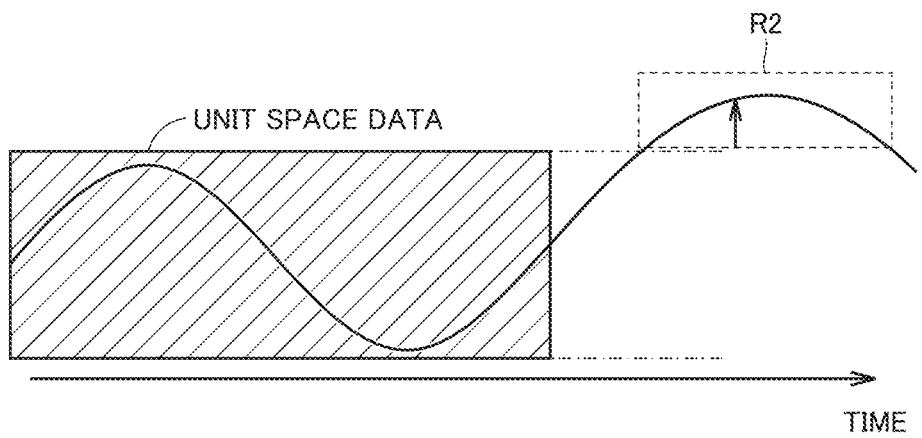

FIG.12
(A)
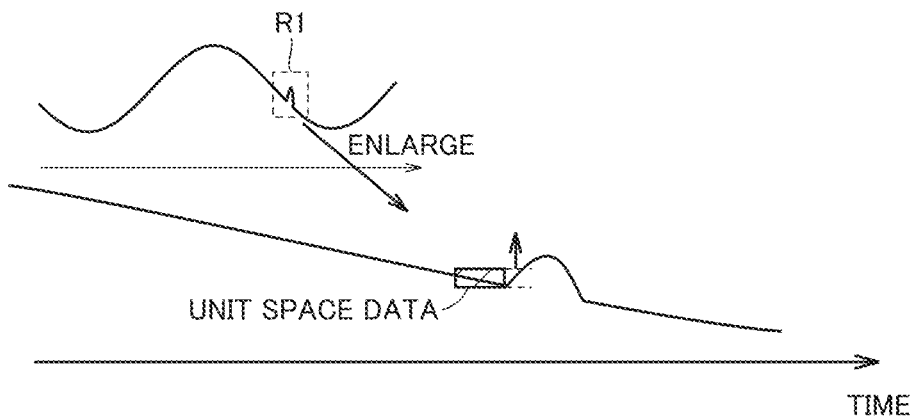
(B)
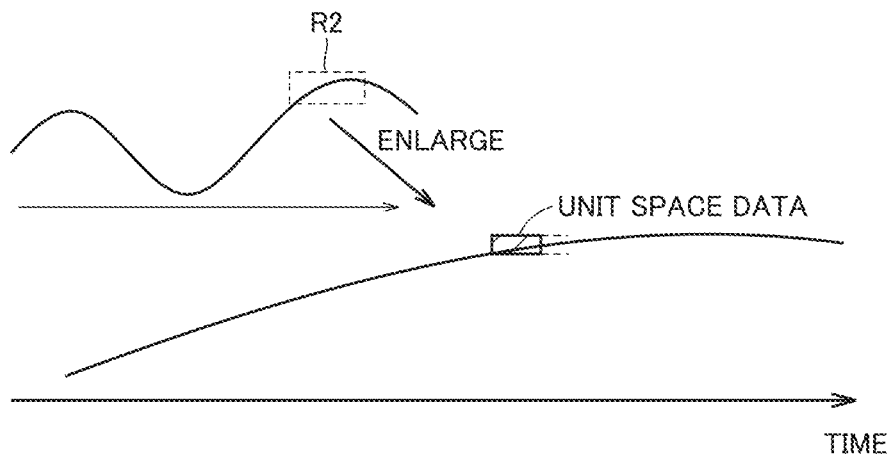
FIG.13
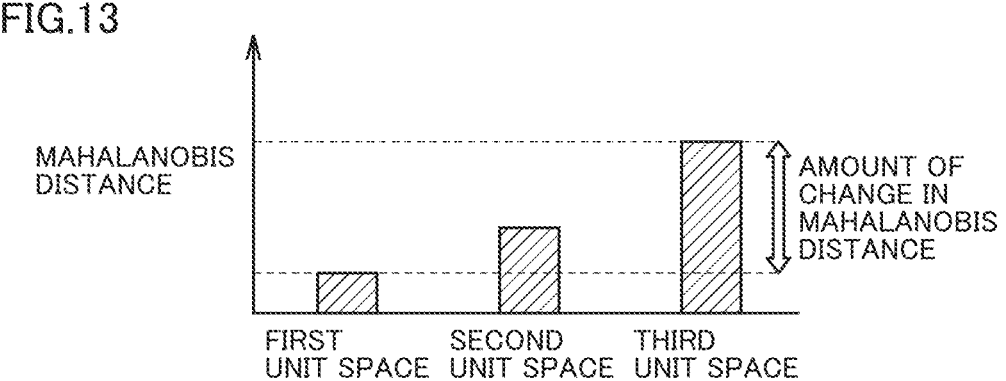

ABNORMALITY DIAGNOSIS METHOD, ABNORMALITY DIAGNOSIS DEVICE AND NON-TRANSITORY COMPUTER READABLE STORAGE MEDIUM

CROSS-REFERENCE TO RELATED APPLICATIONS

The present application is based on PCT filing PCT/JP2020/018135, filed Apr. 28, 2020, which claims priority of the international application PCT/JP2019/030206, filed on Aug. 1, 2019, the entire contents of each are incorporated herein by reference.

TECHNICAL FIELD

The present disclosure relates to an abnormality diagnosis method, an abnormality diagnosis device, and an abnormality diagnosis program.

BACKGROUND ART

State monitoring and abnormality diagnosis of equipment or apparatus are generally made using time-series data of state quantities of a plurality of evaluation items relating to a diagnosis subject. The state quantities of the plurality of evaluation items include various operation data of the diagnosis subject and measurement data, such as temperature and vibration generated from the diagnosis subject, obtained using various sensors.

For example, WO 2009/107805 A (PTL 1), Japanese Patent Laying-Open No. 2017-120504 (PTL 2) and Japanese Patent Laying-Open No. 2016-91417 (PTL 3) disclose a method for determining whether a diagnosis subject is in normal operation by creating, from normal data, a unit space that is a set of normal data serving as a determination reference and analyzing time-series data using a Mahalanobis distance of the unit space and a Mahalanobis distance of the time-series data.

In the above-described determination method, it is necessary to set the unit space suitably for accurate determination as to whether the diagnosis subject is in normal operation. As for this unit space, PTL 1 discloses a method for creating and updating unit space data. In PTL 1, the unit space is created for each operational state such as when a plant starts up or when the plant is in load operation and is updated at regular evaluation intervals.

PTL 2 discloses a method for updating a unit space by which a variance of a set of unit space data and a variance of a set of latest data are obtained at regular intervals, and when a ratio between the variances exceeds a threshold, the unit space is updated.

PTL 3 discloses a method for creating unit space data by which a mean value and standard deviation of a set of data serving as a unit space data candidate are obtained, and data that falls within a range from the mean value to both positive and negative constant multiples of the standard deviation is selected as the unit space data.

CITATION LIST

Patent Literature

PTL 1: WO 2009/107805 A
PTL 2: Japanese Patent Laying-Open No. 2017-120504
PTL 3: Japanese Patent Laying-Open No. 2016-91417

SUMMARY OF INVENTION

Technical Problem

The time-series data acquired from the equipment may contain non-abnormal variations (that is, normal variations) such as variations in response to a change in the operational state of the equipment and variations in response to a change of season (for example, a change in outside air temperature, or the like). It is therefore required that the unit space be suitably created and updated so as to prevent such normal variations from being determined to be abnormal and allow only abnormal variations that portend an accident or a failure to be detected.

In the conventional method for creating and updating the unit space described above, however, how to determine a data length of the unit space is not defined. Note that the data length of the unit space is a time width of data used for the unit space or the number of data. In a case where the data length of the unit space is not suitably set, there is a concern about the possibility that normal variations of the time-series data may be erroneously determined to be abnormal.

Further, in the related art, a determination as to whether a diagnosis subject is abnormal is made on data at a certain diagnosis time using a single unit space, so that there is a concern about the possibility that various abnormalities cannot be detected. For example, in a case where data having a time width equal to one cycle of normal variations is set as the unit space data, variations in data of the diagnosis subject that are larger than the normal variation range set as the unit space data are simply determined to be abnormal, but there is a possibility that a sudden change smaller than the normal variation range is erroneously determined to be normal. On the other hand, in a case where data having a time width shorter than the above-described normal variation cycle is set as the unit space data, even when the above-described sudden change can be determined to be abnormal, there is a possibility that the normal variations are erroneously determined to be abnormal, or an abnormal sign such as deterioration over time corresponding to a gradual variation over an update interval of the unit space or a period longer than the update interval may be erroneously determined to be normal.

The present invention has been made to solve such problems, and it is therefore an object of the present invention to improve accuracy of abnormality determination in an abnormality diagnosis method, abnormality diagnosis device, and abnormality diagnosis program for diagnosing an abnormality in a diagnosis subject using a Mahalanobis distance based on a unit space.

Solution to Problem

An abnormality diagnosis method according to the present disclosure is an abnormality diagnosis method for diagnosing an abnormality in operational state of a diagnosis subject, the abnormality diagnosis method including creating a unit space from normal operation data of the diagnosis subject, the unit space serving as a reference for determining the operational state of the diagnosis subject, acquiring data having state quantities of a plurality of evaluation items from the diagnosis subject, calculating a Mahalanobis distance of the data acquired, using the unit space created, and determining an abnormality in the operational state of the diagnosis subject based on the Mahalanobis distance calculated. The creating a unit space includes creating a plurality of unit spaces having mutually different data lengths. The creating a plurality of unit spaces includes determining a data length of each of the plurality of unit spaces based on at least one of a correlation coefficient between the plurality of evaluation items in the data acquired from the diagnosis subject and a normal variation cycle of the data. The calculating a Mahalanobis distance includes calculating a plurality of Mahalanobis distances using the plurality of unit spaces created. The determining an abnormality includes determining an abnormality based on the plurality of Mahalanobis distances calculated.

An abnormality diagnosis method according to the present disclosure is an abnormality diagnosis method for diagnosing an abnormality in operational state of a diagnosis subject, the abnormality diagnosis method including creating a unit space from normal operation data of the diagnosis subject, the unit space serving as a reference for determining the operational state of the diagnosis subject, acquiring data having state quantities of a plurality of evaluation items from the diagnosis subject, calculating a Mahalanobis distance of the data acquired, using the unit space created, and determining an abnormality in the operational state of the diagnosis subject based on the Mahalanobis distance calculated. The creating a unit space includes creating a plurality of unit spaces having mutually different data lengths. The calculating a Mahalanobis distance includes calculating a plurality of Mahalanobis distances of the data at a same diagnosis time using the plurality of unit spaces created. The determining an abnormality includes determining an abnormality based on the plurality of Mahalanobis distances calculated.

Advantageous Effects of Invention

According to the present disclosure, accuracy of abnormality determination can be improved in the abnormality diagnosis device, abnormality diagnosis method, and abnormality diagnosis program for diagnosing an abnormality in a diagnosis subject using a Mahalanobis distance based on a unit space.

BRIEF DESCRIPTION OF DRAWINGS

FIG. 8 is a flowchart for describing a processing procedure of a second method for determining the update interval of the unit space.

FIG. 9 is a block diagram illustrating an example of a hardware structure of the abnormality diagnosis device according to the first embodiment.

FIG. 10 is a diagram for describing operations and effects of the abnormality diagnosis device according to the first embodiment.

FIG. 11 is a diagram for describing the operations and effects of the abnormality diagnosis device according to the first embodiment.

FIG. 12 is a diagram for describing the operations and effects of the abnormality diagnosis device according to the first embodiment.

FIG. 13 is a diagram for describing an abnormality diagnosis method according to a second embodiment.

DESCRIPTION OF EMBODIMENTS

Figure 1:
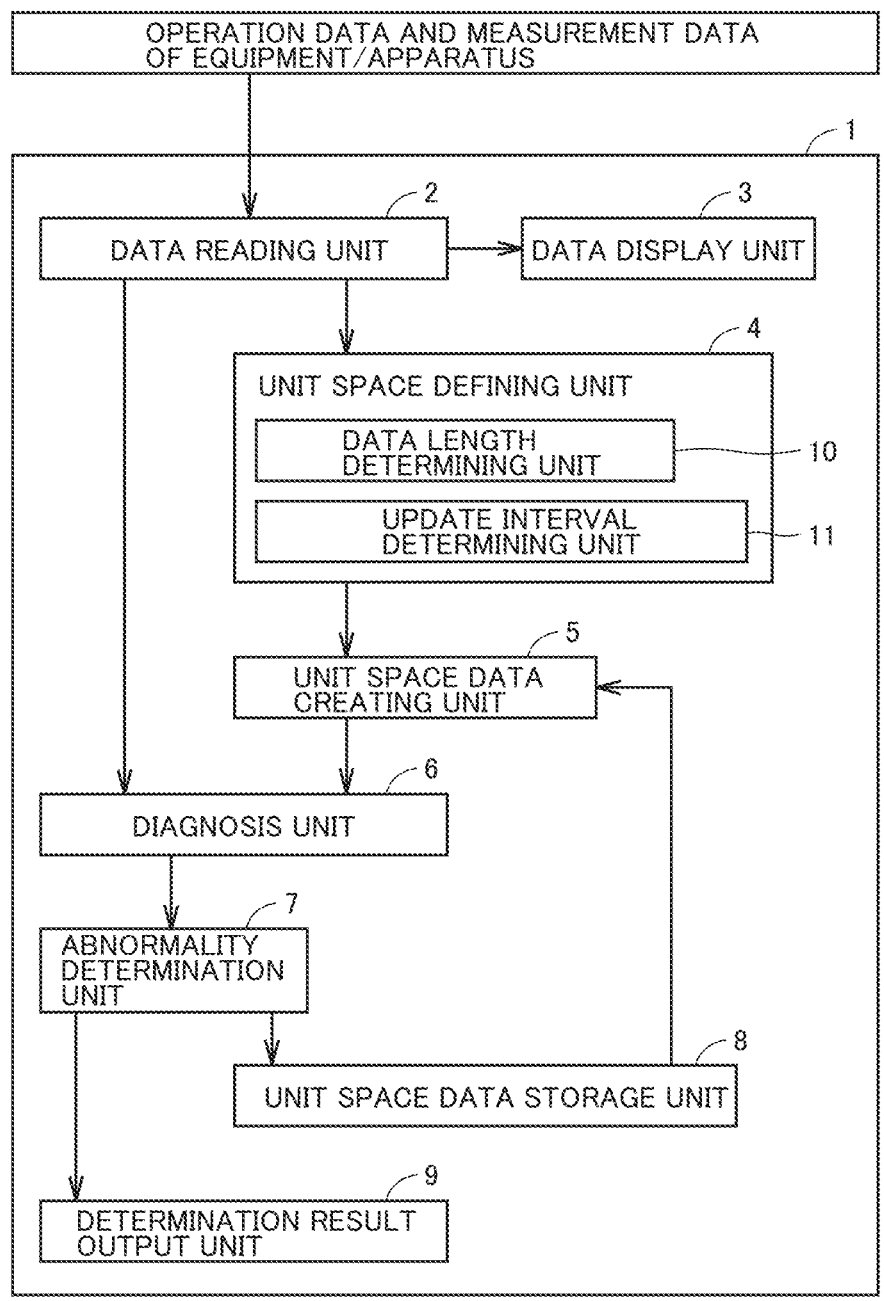
FIG. 1 is a block diagram illustrating a functional structure of an abnormality diagnosis device according to a first embodiment.

Hereinafter, embodiments of the present disclosure will be described in detail with reference to the drawings. Note that, in the following description, the same or corresponding parts in the drawings are denoted by the same reference numerals, and no redundant description will be given of such parts in principle.

First Embodiment

A. Functional Structure of Abnormality Diagnosis Device

First, a functional structure of an abnormality diagnosis device according to the first embodiment will be described. FIG. 1 is a block diagram illustrating the functional structure of the abnormality diagnosis device according to the first embodiment. An abnormality diagnosis device 1 according to the first embodiment is structured to analyze time-series data acquired from equipment or apparatus that is a diagnosis subject (hereinafter, collectively and simply referred to as "equipment") to determine whether an operational state of the equipment is normal and output a result of the determination.

Examples of the equipment that is the diagnosis subject include apparatus such as a generator, factory automation (FA) apparatus, power receiving and distributing apparatus, an elevator, and railroad electrical apparatus. Herein, a structure where abnormality diagnosis device 1 is applied to state monitoring and abnormality diagnosis of a generator will be given as an example.

Referring to FIG. 1, abnormality diagnosis device 1 includes a data reading unit 2, a data display unit 3, a unit space defining unit 4, a unit space data creating unit 5, a diagnosis unit 6, an abnormality determination unit 7, a unit space data storage unit 8, and a determination result output unit 9.

(A-1) Data Reading Unit

Data reading unit 2 reads time-series data acquired from the equipment/apparatus that is the diagnosis subject. The data contains state quantities of a plurality of evaluation items. Herein, the "evaluation items" correspond to names of physical quantities of a plurality of types of time-series data acquired from the equipment/apparatus that is the diagnosis subject and are used for calculating a Mahalanobis distance. When the generator is described as an example, operation data contains evaluation items such as an output, rotation speed, voltage, and current of the generator, and measurement data contains evaluation items such as a temperature and vibration of apparatus or components constituting the generator measured by sensors attached to the generator. Note that such evaluation items are examples, and the number of items of the operation data and measurement data is not limited to a specific number. Data reading unit 2 transmits the read data to data display unit 3, unit space defining unit 4, and diagnosis unit 6.

(A-2) Data Display Unit

Data display unit 3 graphically displays the read data received from data reading unit 2 as time-series data.

(A-3) Unit Space Defining Unit

Unit space defining unit 4 uses the read data received from data reading unit 2 to determine a data length of a unit space to be used for diagnosis and an update interval of the unit space. Herein, the "unit space" serves as a reference for determining the operational state of the diagnosis subject. The unit space is created from operation data and measurement data during normal operation (hereinafter, also referred to as "normal operation data"). The unit space is created from the normal operation data having the data length determined by unit space defining unit 4 and is periodically updated at the update intervals determined by unit space defining unit 4.

As will be described later, abnormality diagnosis device 1 is structured to diagnose an abnormality using a plurality of unit spaces having mutually different data lengths. Therefore, unit space defining unit 4 is structured to determine the data length and update interval of for each of the plurality of unit spaces to be used for diagnosis.

Specifically, unit space defining unit 4 includes a data length determining unit and an update interval determining unit 11. Data length determining unit 10 determines the data length of the unit space. That is, a data range defined as the unit space is determined. Update interval determining unit 11 determines the update interval of the unit space. Herein, the "data length of the unit space" is a time width or number of data used for the unit space. The "update interval of the unit space" is a period during which a diagnosis is made using the same unit space.

(a) Data Length Determining Unit

Data length determining unit 10 determines the data length of the unit space using normal operation data among the read data. Note that data length determining unit 10 may use data obtained as a result of performing desired arithmetic processing on the normal operation data as necessary. Examples of the desired arithmetic processing include differentiation, moving averaging, or obtaining a sum of, difference between, or mean of time-series data of the plurality of evaluation items.

Data length determining unit 10 determines a plurality of data lengths of a plurality of unit spaces to be used for diagnosis. In order to determine the data length of the unit space, at least either (1) a determination method based on a correlation coefficient between a plurality of evaluation items of the read data or (2) a determination method based on a normal variation cycle of the read data in a manner that depends on characteristics of the equipment that is the diagnosis subject is used.

Figure 2:
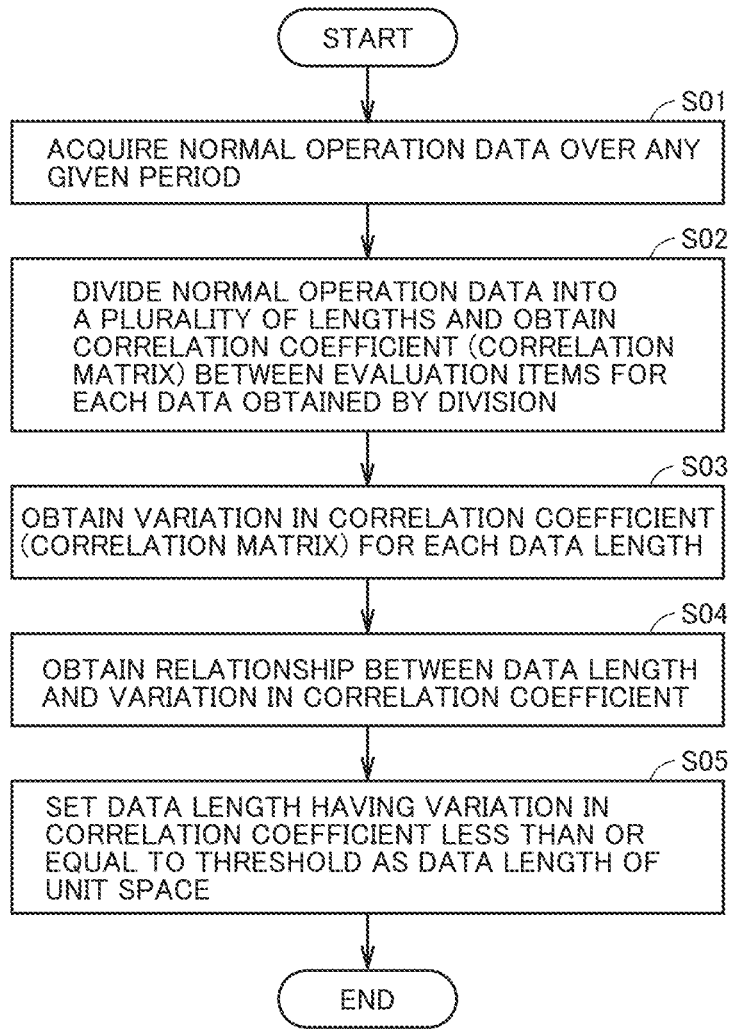
FIG. 2 is a flowchart for describing a processing procedure of a first method for determining a data length of a unit space.

First, an example of (1) the method for determining the data length of the unit space based on the correlation coefficient (correlation matrix) between the plurality of evaluation items of the read data will be described. FIG. 2 is a flowchart for describing a processing procedure of the determination method.

Referring to FIG. 2, data length determining unit 10 acquires normal operation data existing over any given period from the read data received from data reading unit 2 in step S01. The normal operation data includes operation data and measurement data acquired in an operational state when neither abnormality nor failure occurs and contains state quantities of a plurality of evaluation items. Further, any given period may be few days, few months, or few years. Note that the longer the period, the more the diagnosis accuracy can be increased.

In step S02, data length determining unit 10 divides the normal operation data acquired in step S01 into a plurality of any given lengths and obtains a correlation coefficient between the plurality of evaluation items for each data obtained as a result of the division.

The plurality of any given data lengths may be each determined to be equal to a constant multiple of a measurement time or the number of measurement days, for example, 720 points, 1440 points, 4320 points, 14400 points, or 43200 points. Note that 720 points correspond to the number of data for 12 hours with a data sampling period set to 1 minute. 1440 points correspond to the number of data for one day, and 4320 points correspond to the number of data for three days. 14400 points correspond to the number of data for 10 days, and 43200 points correspond to the number of data points for 30 days.

Figure 3:
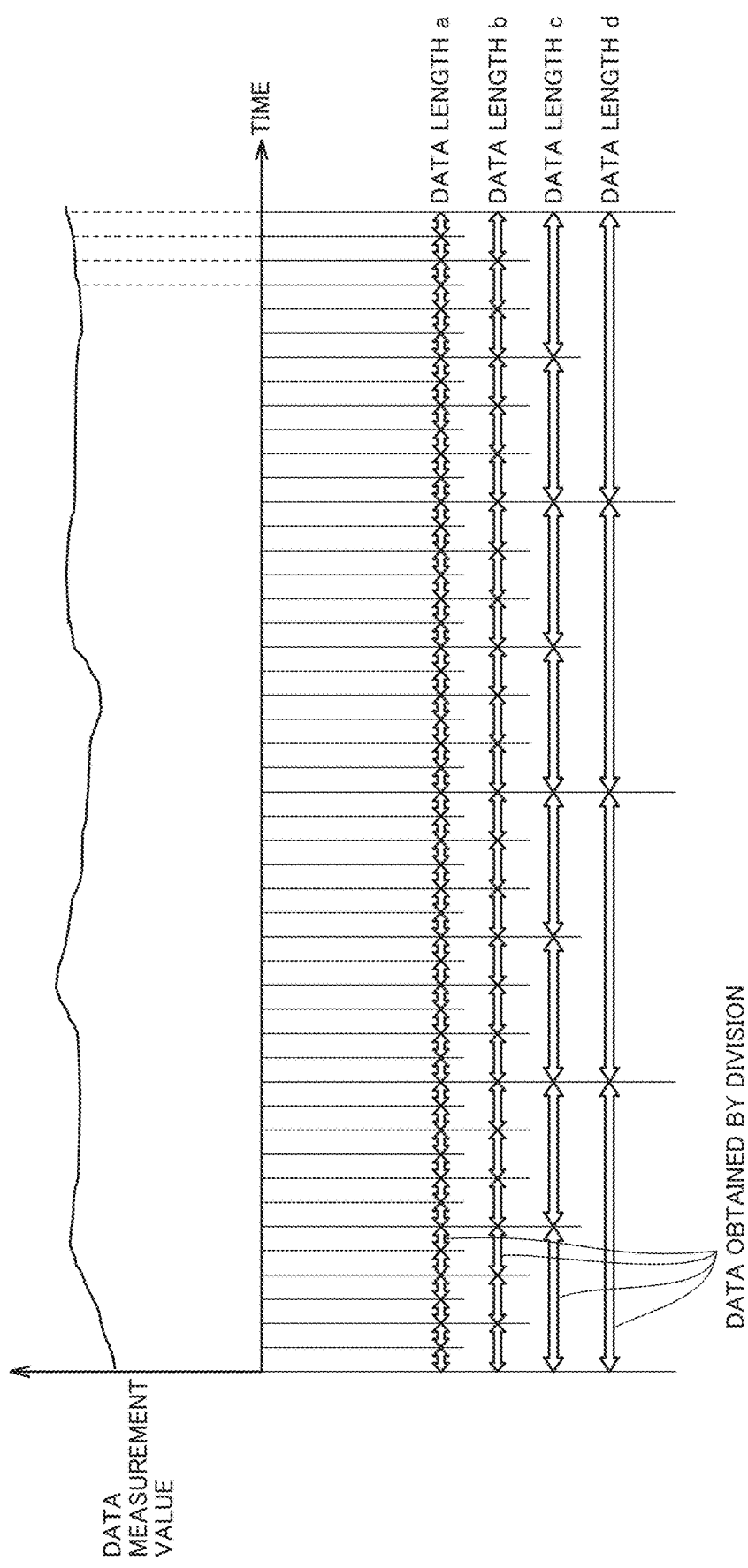
FIG. 3 is a diagram for describing step S02 in FIG. 2.

FIG. 3 illustrates an example where normal operation data existing over a certain period displayed on a time-series basis is divided into any given data lengths a, b, c, d. Data length b is twice data length a, data length c is six times data length a, and data length d is 12 times data length a. In the example illustrated in FIG. 3, time-series data of one evaluation item is divided, but time-series data of the plurality of evaluation items is actually present, and thus time-series data of the other evaluation items is also divided in the same manner as the above-described time-series data of the evaluation item.

Data length determining unit 10 obtains, for each data obtained as a result of the division, a correlation coefficient between the plurality of evaluation items included in the data obtained as a result of the division. The correlation coefficient is an indicator indicating the degree of linear correlation between two items. The stronger the positive correlation between the two items, the closer the correlation coefficient to 1, and the stronger the negative correlation, the closer the correlation coefficient to −1. When there is almost no correlation between the two items, the correlation coefficient becomes close to 0.

Note that, when the number of evaluation items included in each data obtained as a result of the division is greater than or equal to three, data length determining unit obtains a correlation matrix. The correlation matrix is a matrix in which correlation coefficients are arranged and is a diagonal matrix. Since the correlation coefficient between the same items is 1, all diagonal elements of the correlation matrix become 1. The correlation coefficient and the correlation matrix can be obtained using a well-known method.

Returning to FIG. 2, in step S03, data length determining unit 10 calculates a variation in the correlation coefficient obtained in step S02 for each identical data length. The variation in the correlation coefficient can be calculated from the variance or standard deviation of the correlation coefficient of the same item (of the same element of the correlation matrix). The number of data for which the variation in the correlation coefficient is obtained in step S03 may be all the data obtained as a result of the division. Alternatively, the number of data for which the variation in the correlation coefficient is obtained may be equal to the number of data having the longest data length, in other words, the number of data obtained as a result of the smallest number of division. In the example illustrated in FIG. 3, the variation in the correlation coefficient may be obtained using the number of data having data length d corresponding to the smallest number of division.

Figure 4:
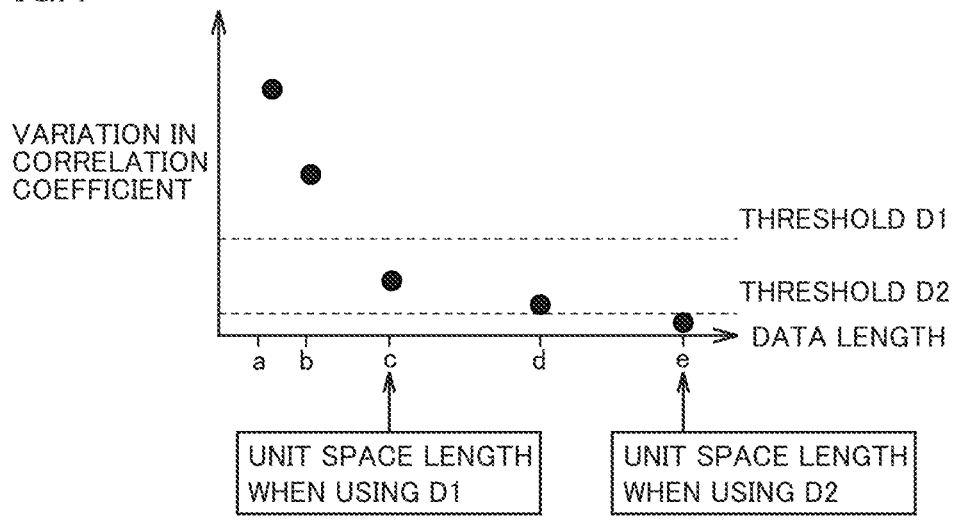
FIG. 4 is a diagram for describing step S04 in FIG. 2.

In step S04, data length determining unit 10 obtains a relationship between the variation in the correlation coefficient obtained in step S03 and the data length. For example, as illustrated in FIG. 4, data length determining unit 10 creates a graph where the variation in the correlation coefficient is on the vertical axis and the data length is on the horizontal axis. In this graph, the variation in the correlation coefficient is plotted for each data length.

As the variation in the correlation coefficient, a mean value of variations in all correlation coefficients obtained for one data length (all correlation coefficients between the plurality of evaluation items) may be used, or a maximum value of the variations in all the correlation coefficients may be used. Alternatively, a value freely selected from the variations in all the correlation coefficients or a mean value of variations in a plurality of freely selected correlation coefficients may be used.

In the case of FIG. 4, the variation in the correlation coefficient for each data length indicates a variation in the degree of correlation between two items included in data having the data length. When the correlation between the two items does not vary to a large extent over the data length, the variation in the correlation coefficient decreases, whereas when the correlation between the two items varies, the variation in the correlation coefficient increases.

FIG. 4 illustrates relationships between the five data lengths a to e and the variation in the correlation coefficient. This shows that the longer the data length, the smaller the variation in the correlation coefficient. On the other hand, the shorter the data length, the larger the variation in correlation coefficient. When the Mahalanobis distance is calculated using a unit space having a data length with a large variation in the correlation coefficient, the Mahalanobis distance becomes larger even when data is normal, which gives rise to a concern about the possibility that the data is erroneously determined to be abnormal.

Returning to FIG. 2, in step S05, data length determining unit 10 sets a threshold for the variation in the correlation coefficient. In the example illustrated in FIG. 4, two thresholds D1 and D2 having different magnitudes are set. Data length determining unit 10 determines a data length having the variation in the correlation coefficient less than or equal to the threshold as the data length of the unit space to be used for diagnosis.

Specifically, data length determining unit 10 can set, as the data length of the unit space, data length c out of data lengths c, d, e having variation in the correlation coefficient less than or equal to threshold D1. Further, data length determining unit can determine, as the data length of the unit space, data length e having the variation in the correlation coefficient less than or equal to threshold D2.

Data length determining unit 10 may determine a plurality of unit spaces having mutually different data lengths based on a plurality of thresholds provided. Alternatively, data length determining unit 10 may determine data lengths of the plurality of unit spaces using another method for determining the data length of the unit space based on the correlation coefficient between the plurality of evaluation items or the method for determining the data length of the unit space based on the normal variation cycle in combination as described below.

Another method for determining the data length of the unit space based on the correlation coefficient between the plurality of evaluation items includes a method for determining the data length of the unit space based on a change in the correlation coefficient. The number of time-series data made up of the plurality of evaluation items is increased one by one, and the correlation coefficient (or correlation matrix) between the plurality of evaluation items making up the time-series data is obtained each time the number of data is increased. A relationship between the correlation coefficient and the number of data is evaluated, and then the number of data that brings the correlation coefficient into a certain range may be set as the data length of the unit space. Alternatively, a relationship between a rate of change in the correlation coefficient and the number of data is evaluated, and then the number of data that makes the rate of change in the correlation coefficient close to zero may be set as the data length of the unit space.

Here, since there are a plurality of correlation coefficients and rates of change in the correlation coefficients according to the number of evaluation items as described above, a mean value of correlation coefficients (or rates of change in the correlation coefficients) between all the evaluation items may be used, or a correlation coefficient having the largest change (or a rate of change in the correlation coefficient), a correlation coefficient selected as desired (or a rate of change in the correlation coefficient), or a mean value of freely selected correlation coefficients may be used. As described above, the data length of the unit space is determined based on the correlation coefficient between the plurality of evaluation items.

Figure 5:
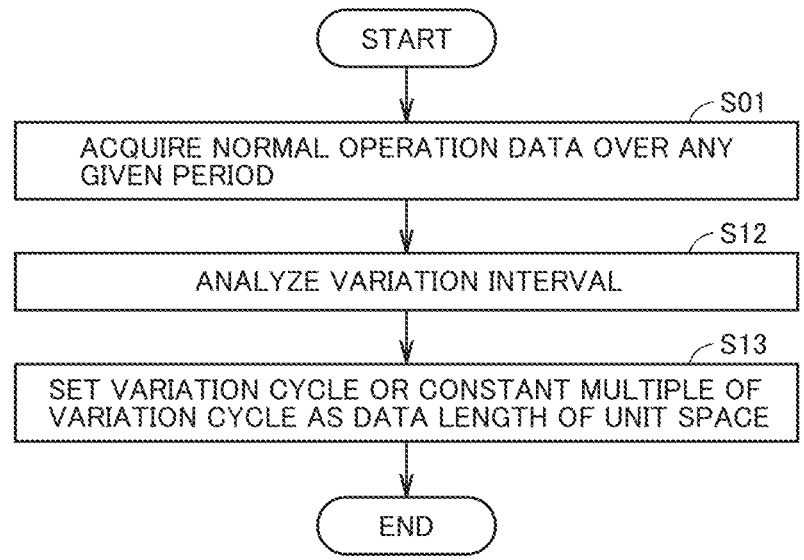
FIG. 5 is a flowchart for describing a processing procedure of a second method for determining the data length of the unit space.

Next, (2) the method for determining the data length of the unit space based on the normal variation cycle of the read data will be described. FIG. 5 is a flowchart for describing a processing procedure of the determination method.

Referring to FIG. 5, data length determining unit 10 acquires normal operation data existing over any given period in step S01 that is the same as in FIG. 2.

In step S12, data length determining unit 10 analyzes a variation cycle of the normal operation data acquired in step S01. The analysis of the variation cycle of the normal operation data may be made using a well-known technology such as general-purpose analysis software.

In step S13, data length determining unit 10 determines the variation cycle of the normal operation data obtained through the analysis in step S12 or a constant multiple of the variation cycle as the data length of the unit space. Data length determining unit 10 may determine the data lengths of the plurality of unit spaces in combination with the above-described data length of the unit space determined based on the correlation coefficient between the plurality of evaluation items.

(b) Update Interval Determining Unit

Returning to FIG. 1, update interval determining unit 11 determines the update interval of the unit space using the normal operation data among the read data. As described above, the update interval of the unit space is a period during which a diagnosis is made using the same unit space. Therefore, at an update time based on the update interval thus determined, a diagnosis is made using a new unit space.

The reason for updating the unit space is that, in a case where a variation in data of the equipment that is the diagnosis subject includes a normal variation that is not abnormal such as a seasonal variation, when a diagnosis is made without updating the unit space, such a normal data variation may be erroneously determined to be abnormal, or an abnormal data variation may be erroneously determined to be normal.

In order to determine the update interval, at least either (1) the determination method based on the correlation coefficient (correlation matrix) between the plurality of evaluation items of the read data or (2) the determination method based on the normal variation cycle of the read data in a manner that depends on characteristics of the equipment that is the diagnosis subject.

Figure 6:
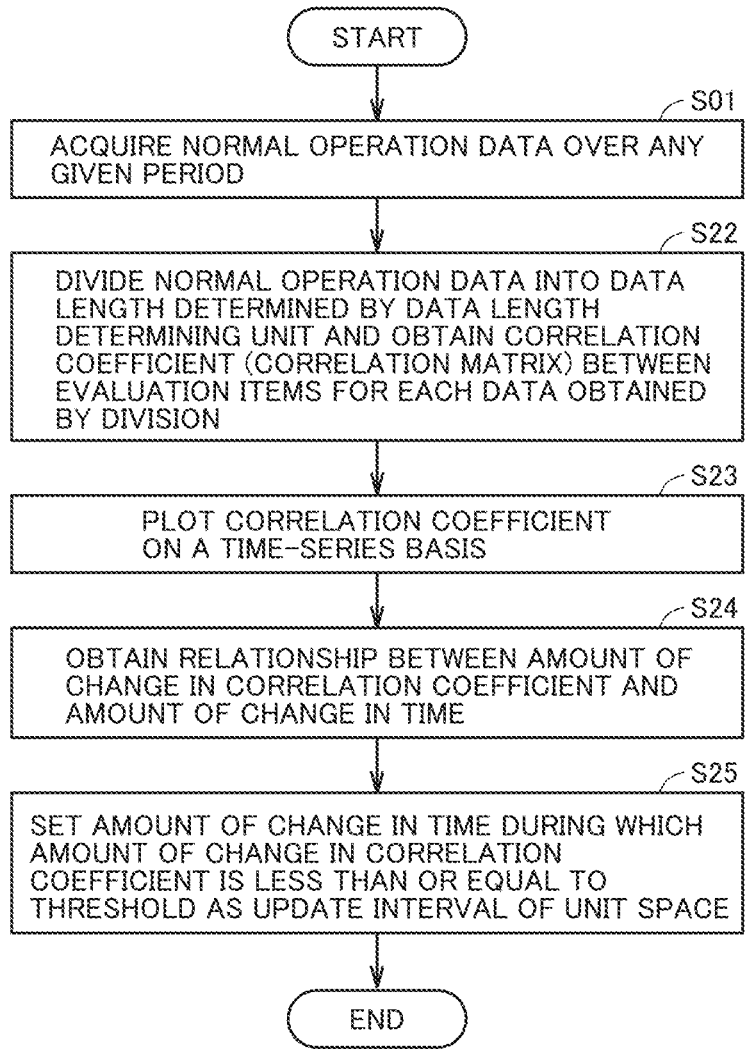
FIG. 6 is a flowchart for describing a processing procedure of a first method for determining an update interval of the unit space.

First, (1) the method of determining the update interval of the unit space based on the correlation coefficient between the evaluation items of the read data will be described. FIG. 6 is a flowchart for describing a processing procedure of the determination method.

Referring to FIG. 6, update interval determining unit 11 acquires normal operation data existing over any given period in step S01 that is the same as in FIG. 2.

Update interval determining unit 11 divides the normal operation data thus acquired into the data length of the unit space determined by data length determining unit 10 in S22 and obtains the correlation coefficients (or correlation matrix) between the plurality of evaluation items of each data obtained as a result of the division.

In step S23, update interval determining unit 11 plots, on a time-series basis, the correlation coefficients obtained in step S22 based on the time of the normal operation data used for creating the correlation coefficients. As the time of the normal operation data, for example, any one of a start time or end time of the time-series data for which the correlation coefficients are obtained, an intermediate time between the start time and the end time, or the like may be used.

In step S24, update interval determining unit 11 obtains a relationship between the amount of change in the correlation coefficient and the amount of change in time based on the time-series plot of the correlation coefficients created in step S23. The amount of change in the correlation coefficient may be a value obtained by time-differentiation of the time-series change in the correlation coefficient or a difference between a correlation coefficient at time t and a correlation coefficient at time t−m (m is any constant).

Figure 7:
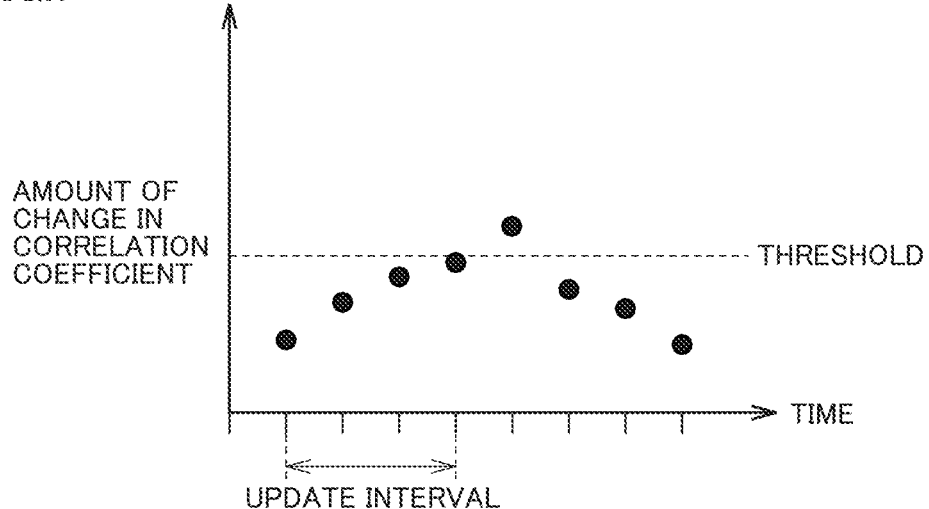
FIG. 7 is a diagram for describing step S25 in FIG. 6.

FIG. 7 is a graph where the relationship between the amount of change in the correlation coefficient obtained as the difference between the correlation coefficient at time t and the correlation coefficient at time t−m (m is any constant) and the amount of change in time m. In FIG. 7, the vertical axis represents the amount of change in the correlation coefficient, and the horizontal axis represents the amount of change in time.

In step S25, update interval determining unit 11 sets, as the update interval, the amount of change in time during which the amount of change in the correlation coefficient is less than or equal to a predetermined threshold. The amount of change in the correlation coefficient is obtained multiple times according to the number of items used for diagnosis, but the mean value or maximum value of the amounts of change in all the correlation coefficients may be used. Alternatively, the amount of change in any given correlation coefficient may be used, or the mean value of the amounts of change in a plurality of freely selected correlation coefficients may be used.

Next, (2) the method for determining the update interval of the unit space based on the normal variation cycle of the read data will be described. FIG. 8 is a flowchart for describing a processing procedure of the determination method.

Referring to FIG. 8, update interval determining unit 11 acquires normal operation data existing over any given period in step S01 that is the same as in FIG. 2.

Update interval determining unit 11 analyzes, in step S12 that is the same as in FIG. 5, a variation cycle of the normal operation data acquired in step S01. The analysis of the variation cycle may be made using a well-known technology such as general-purpose analysis software.

In step S33, update interval determining unit 11 determines the variation cycle of the normal operation data obtained through the analysis in step S12 or a constant multiple of the variation cycle as the update interval of the unit space.

(A-4) Unit Space Data Creating Unit

Returning to FIG. 1, unit space data creating unit 5 creates unit space data based on the data length and update interval of the unit space determined by unit space defining unit 4. Note that the unit space data means data making up the unit space, and, hereinafter, corresponds to the unit space. During the first diagnosis (in a state where no data is stored in unit space data storage unit 8), unit space data creating unit 5 extracts the normal operation data having the data length determined by unit space defining unit 4 from the read data, and sets the normal operation data thus extracted as the unit space data.

When the diagnosis reaches the update time set based on the update interval determined by update interval determining unit 11, unit space data creating unit 5 creates the unit space to be used for diagnosis after the update time from data having the Mahalanobis distance less than or equal to the threshold (that is, determined to be normal) among data on which a diagnosis has been made in accordance with the Mahalanobis Taguchi (MT) system. Specifically, at the update time, unit space data creating unit 5 extracts data having the data length determined by unit space defining unit 4 from data determined to be normal among data stored in unit space data storage unit 8 and sets the data thus extracted as the unit space data.

(A-5) Diagnosis Unit

Diagnosis unit 6 obtains the Mahalanobis distance in accordance with the MT system using the unit space created by unit space data creating unit 5 and the data read by data reading unit 2 and subjected to preprocessing as necessary. The Mahalanobis distance may be calculated by a known method. Note that diagnosis unit 6 obtains a plurality of Mahalanobis distances for data at a certain diagnosis time according to the number of unit spaces.

(A-6) Abnormality Determination Unit

Abnormality determination unit 7 determines whether the operational state of the equipment that is the diagnosis subject is abnormal based on the plurality of Mahalanobis distances obtained by diagnosis unit 6. Specifically, abnormality determination unit 7 determines whether the operational state of the equipment is abnormal by comparing the plurality of Mahalanobis distances calculated using the plurality of unit spaces with a predetermined threshold.

Abnormality determination unit 7 determines whether the operational state of the equipment is abnormal using a combination of the plurality of results of the determination based on the plurality of Mahalanobis distances. Specifically, in a case of making a diagnosis using the plurality of unit spaces having mutually different lengths, abnormality determination unit 7 determines that the operational state of the equipment is abnormal when at least one of the plurality of Mahalanobis distances corresponding to the plurality of unit spaces is greater than or equal to the threshold.

(A-7) Unit Space Data Storage Unit

Unit space data storage unit 8 stores data having the state quantities of the plurality of evaluation items on which a diagnosis has been made by diagnosis unit 6 and the Mahalanobis distance with the data and the Mahalanobis distance associated with each other.

Unit space data creating unit 5 creates the unit space to be used for diagnosis after each update time from data having the Mahalanobis distance less than or equal to the threshold among the data stored in unit space data storage unit 8. At the update time of the unit space, unit space data creating unit 5 extracts data having the data length determined by data length determining unit 10 from the data stored in unit space data storage unit 8 to create the unit space and update the unit space. Therefore, diagnosis unit 6 obtains the Mahalanobis distance using the unit space thus updated.

The storage of data in unit space data storage unit 8 and the update of the unit space by unit space data creating unit 5 described above are repeatedly performed.

(A-8) Determination Result Output Unit

Determination result output unit 9 outputs the result of determination made by abnormality determination unit 7. Determination result output unit 9 includes, for example, a display unit, and displays, on the display unit, time-series changes in the plurality of Mahalanobis distances obtained using the plurality of unit spaces. Determination result output unit 9 further displays, on the display unit, the result of determination as to whether the operational state of the diagnosis subject is abnormal based on all the Mahalanobis distances. Determination result output unit 9 may be structured to display such results of determination on the display unit and transmit the results of determination to an external device using a communication unit (not illustrated).

B. Example of Hardware Structure of Abnormality Diagnosis Device

Next, an example of a hardware structure of the abnormality diagnosis device according to the first embodiment will be described.

FIG. 9 is a block diagram illustrating an example of the hardware structure of the abnormality diagnosis device according to the first embodiment. Referring to FIG. 9, abnormality diagnosis device 1 includes a central processing unit (CPU) 20 and a memory that stores a program and data, and CPU 20 operates in accordance with the program to implement the functional structure illustrated in FIG. 1.

The memory includes a read only memory (ROM) 21, a random access memory (RAM) 22, and a hard disk drive (HDD) 23. ROM 21 can store the program to be executed by CPU 20. RAM 22 can temporarily store data used during execution of the program by CPU 20 and can serve as a temporary data memory used as a work area. HDD 23 is a nonvolatile storage device and can store data read by data reading unit 2, data used for creating the unit space, the result of determination made by abnormality determination unit 7, and the like. In addition to or instead of the HDD, a semiconductor storage device such as a flash memory may be used.

Abnormality diagnosis device 1 further includes a communication interface (I/F) 24, an input/output (I/O) interface 25, an input unit 26, and a display unit 27. Communication interface 24 is an interface for abnormality diagnosis device 1 to communicate with an external device including the equipment that is the diagnosis subject. Communication interface 24 corresponds to one embodiment of "data reading unit 2".

I/O interface 25 is an interface for input to abnormality diagnosis device 1 or output from abnormality diagnosis device 1. As illustrated in FIG. 9, I/O interface 25 is connected to input unit 26 and display unit 27.

Input unit 26 receives, from a user, input containing a command directed to abnormality diagnosis device 1. Input unit 26 includes a keyboard, a mouse, a touchscreen provided together with a display screen of the display unit, and the like and receives settings such as thresholds used by unit space defining unit 4 and abnormality determination unit 7, and the like.

Display unit 27 corresponds to one embodiment of "data display unit 3" and "determination result output unit 9". Display unit 27 can display time-series data acquired from the diagnosis subject, the result of determination made by abnormality determination unit 7, and the like.

C. Operations and Effects

Next, operations and effects achieved by abnormality diagnosis device 1 according to the first embodiment will be described.

As described above, abnormality diagnosis device 1 according to the first embodiment is configured to diagnose an abnormality in the diagnosis subject using the plurality of unit spaces having mutually different data lengths. This makes it possible to prevent normal variations in time-series data from being determined to be abnormal and appropriately determine a sign of an abnormality that portends an accident or a failure. Such operations and effects will be described in detail with reference to FIGS. 10 to 12.

FIG. 10(A) illustrates a waveform of time-series data having normal variations such as seasonal variations. FIG. 10 and subsequent drawings each illustrate, for the sake of simplicity, a waveform of time-series data on one of the plurality of evaluation items.

FIG. 10(B) illustrates a waveform of time-series data in which a sudden variation (corresponding to a region R1 in the drawing) smaller than the normal variations occurs. FIG. 10(C) illustrates a waveform of time-series data in which a long-term variation (corresponding to a region R2 in the drawing) larger than the normal variations occurs.

In order to determine an abnormality in the diagnosis subject with high accuracy, it is required that the normal variations illustrated in FIG. 10(A) is not determined to be abnormal and both the variations illustrated in FIGS. 10(B) and 10(C) be determined to be abnormal.

FIG. 11 illustrates a case where an abnormality is diagnosed based on the time-series data illustrated in FIGS. 10(B) and 10(C) using a unit space having a data length almost equal to the variation cycle of the normal operation data. FIG. 11(A) illustrates a diagnosis of an abnormality based on the time-series data illustrated in FIG. 10 (B), and FIG. 11(B) illustrates a diagnosis of an abnormality based on the time-series data illustrated in FIG. 10(C).

As illustrated in FIG. 11(A), in a case where an abnormality is diagnosed using a unit space having a long data length, the sudden variation smaller than the normal variations falls within the unit space, so that such a sudden variation cannot be detected based on the Mahalanobis distance. On the other hand, as illustrated in FIG. 11(B), the long-term variation larger than the normal variations falls outside the unit space, so that such a long-term variation can be detected based on the Mahalanobis distance.

FIG. 12 illustrates a case where an abnormality is diagnosed based on the time-series data illustrated in FIGS. 10(B) and 10(C) using a unit space having a data length sufficiently shorter than the variation cycle of the normal operation data. FIG. 12(A) illustrates a diagnosis of an abnormality based on the time-series data illustrated in FIG. 10(B), and FIG. 12(B) illustrates a diagnosis of an abnormality based on the time-series data illustrated in FIG. 10(C).

As illustrated in FIG. 12(A), in a case where an abnormality is diagnosed using a unit space having a short data length, the sudden variation smaller than the normal variations falls outside the unit space, so that such a sudden variation can be detected based on the Mahalanobis distance. On the other hand, as illustrated in FIG. 12(B), the long-term variation corresponds to a gradual variation in value, and a diagnosis using a unit space having a short data length makes the value of data making up the unit space close to the value of data of the diagnosis subject, so that an increase in the Mahalanobis distance becomes small, and, as a result, such a long-term variation is not determined to be abnormal, and then the unit space is updated. This causes the diagnosis to continue using the unit space containing an abnormality, and, as a result, the abnormality is not detected.

As described above, a configuration where an abnormality is diagnosed using a single unit space cannot handle various abnormal variations. On the other hand, abnormality diagnosis device 1 according to the first embodiment uses a plurality of unit spaces having mutually different data lengths. That is, the plurality of unit spaces include a unit space having a long data length illustrated in FIG. 1 and a unit space having a short data length illustrated in FIG. 12. Therefore, an abnormal variation can be detected by a diagnosis using at least one of the plurality of unit spaces. This allows abnormality diagnosis device 1 according to the first embodiment to handle various abnormal variations and thus determine an abnormality with high accuracy.

Second Embodiment

As for the first embodiment described above, the configuration where an abnormality in the equipment is diagnosed using the plurality of unit spaces having mutually different data lengths has been described. As for the second embodiment, a configuration where even an abnormal variation such as deterioration over time corresponding to a gradual variation over time longer than the update interval can be detected will be described. Specifically, a configuration where an abnormality in the equipment is diagnosed using a plurality of unit spaces having mutually different data collection times will be described. Note that no description will be given of the same points as the points according to the first embodiment and already described for the first embodiment.

D. Functional Structure of Abnormality Diagnosis Device

According to the second embodiment, in order to create a unit space having the data length determined using the above-described method, unit space data creating unit 5 (see FIG. 2) creates a set of unit spaces including a plurality of unit spaces having different data collection times.

For example, when the data length is 43200 points, unit space data creating unit 5 creates three unit spaces having mutually different data collection times. 43200 points correspond to the number of data for 30 days with the data sampling period set to 1 minute.

The first unit space has a data acquisition start time (hereinafter, also referred to as a unit space start time) set to 30 days before a diagnosis start time and has the number of data for 30 days existing over a period from 30 days before to the diagnosis start time. The second unit space has a unit space start time set to 60 days before the diagnosis start time and has the number of data for 30 days existing over a period from 60 days before to 30 days before. The third unit space has a unit space start time set to 90 days before the diagnosis stat time and has the number of data for 30 days existing over a period from 90 days before to 60 days before.

Note that the unit space start time can be freely determined to be a time earlier by at least the data length of the unit space (for example, 30 days) than the diagnosis start time. Further, it is desirable that the second unit space start time and the third unit space start time be each set to a time earlier by at least the update interval of the unit space. According to the present embodiment, a configuration where three unit spaces corresponding to three past periods are provided is given as an example, but there is no limitation on the number of unit spaces.

Diagnosis unit 6 (see FIG. 1) obtains the Mahalanobis distance at the same diagnosis time for each of the three unit spaces created by unit space data creating unit 5. That is, diagnosis unit 6 obtains a first Mahalanobis distance based on the first unit space, a second Mahalanobis distance based on the second unit space, and a third Mahalanobis distance based on the third unit space.

Abnormality determination unit 7 (see FIG. 1) determines an abnormality in the equipment based on the amount of change in the three Mahalanobis distances. FIG. 13 is a diagram for describing an abnormality determination method. FIG. 13 illustrates the respective first to third Mahalanobis distances of the first to third unit spaces. The amount change in the Mahalanobis distance corresponds to a range of variation between the first Mahalanobis distance and the third Mahalanobis distance. In the example illustrated in FIG. 13, the amount of change in the Mahalanobis distance corresponds to a difference between the first Mahalanobis distance that is the minimum value and the third Mahalanobis distance that is the maximum value.

When the amount of change in the Mahalanobis distance is greater than a predetermined threshold, abnormality determination unit 7 determines that the operational state of the equipment is abnormal. Note that abnormality determination unit 7 may be structured to diagnose an abnormality in the equipment by using not only the diagnosis using a plurality of unit spaces having mutually different data collection times but also the diagnosis according to the first embodiment.

E. Operations and Effects

Next, operations and effects achieved by the abnormality diagnosis device according to the second embodiment will be described. In the following description, it is assumed that an abnormality in the diagnosis subject is diagnosed using three unit spaces having mutually different data collection times.

Figure 14:
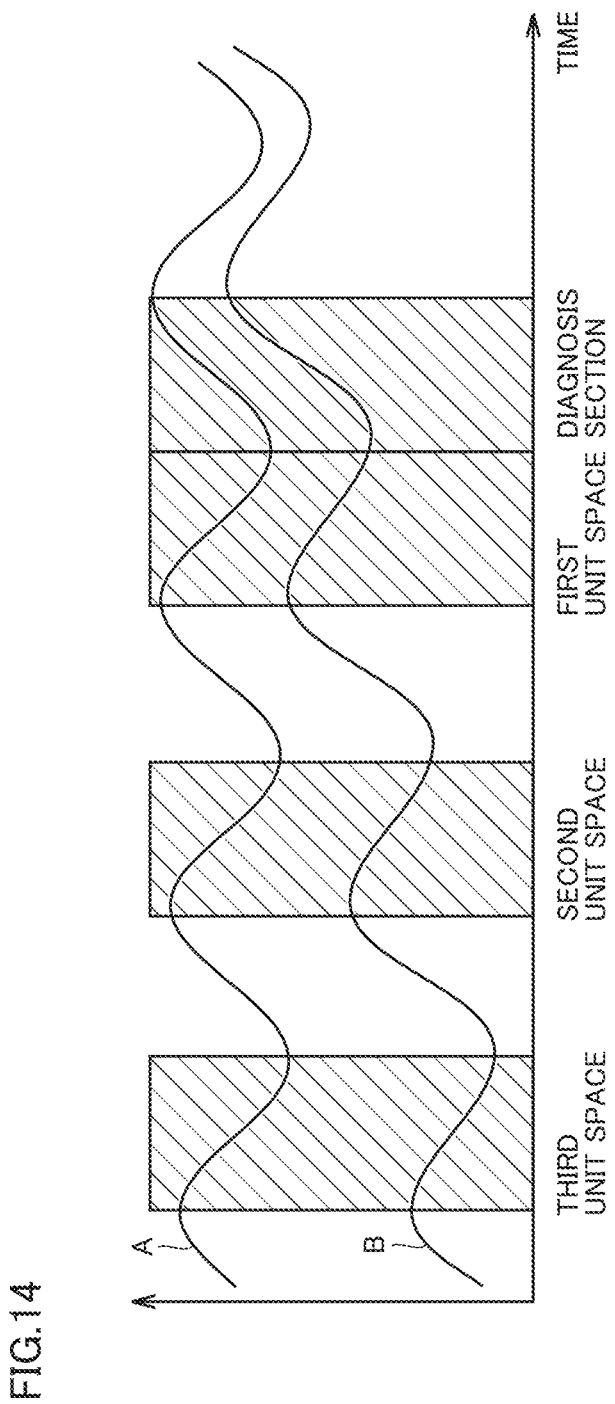
FIG. 14 is a diagram for describing operations and effects of an abnormality diagnosis device according to the second embodiment.

FIG. 14 illustrates waveforms of two types of time-series data. A waveform A is a waveform of time-series data having normal variations. A waveform B is similar in variation to waveform A, but the magnitude of the data gradually increases. Such a gradual variation corresponds to an abnormal variation such as deterioration over time corresponding to a gradual variation over time longer than the update interval of the unit space.

The first unit space is created from normal operation data collected immediately before the start time of the diagnosis section. The second unit space is created from normal operation data collected before the first unit space. The third unit space is created from normal operation data collected before the second unit space. The first to third unit spaces have mutually different normal operation data collection times.

Figure 15:
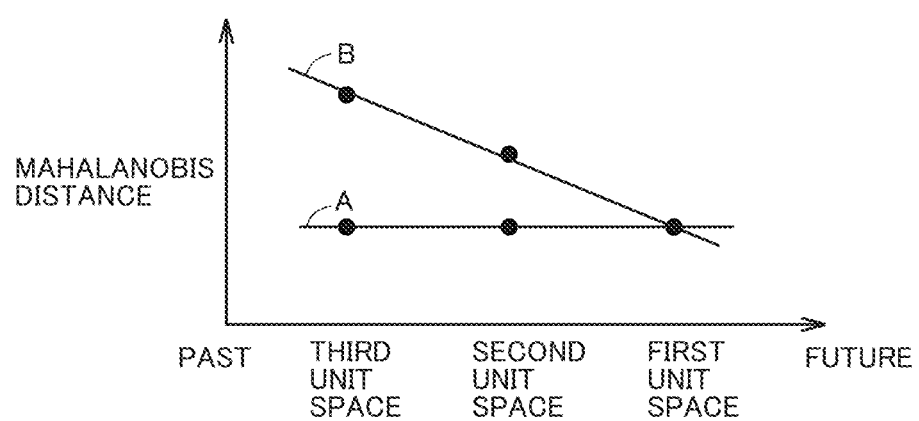
FIG. 15 is a diagram for describing the operations and effects of the abnormality diagnosis device according to the second embodiment.

Diagnosis unit 6 (see FIG. 1) calculates the Mahalanobis distance in accordance with the MT system using the data in the diagnosis section and each of the first to third unit spaces. FIG. 15 illustrates the Mahalanobis distance calculated for each of waveforms A and B illustrated in FIG. 14. For each waveform, the Mahalanobis distance calculated using the first unit space, the Mahalanobis distance calculated using the second unit space, and the Mahalanobis distance calculated using the third unit space are illustrated.

For waveform A, the three Mahalanobis distances have the same magnitude and do not differ in a manner that depends on the unit space data collection time. On the other hand, for waveform B, the Mahalanobis distance of the third unit space is the largest, and the Mahalanobis distance of the first unit space is the smallest. As described above, when abnormal variations appear in the time-series data due to deterioration over time, the Mahalanobis distance changes in a manner that depends on the unit space data collection time.

Abnormality determination unit 7 (see FIG. 1) determines an abnormality in the diagnosis subject based on the amount of change in the three Mahalanobis distances. The amount change in the Mahalanobis distance corresponds to a range of variation between the first Mahalanobis distance and the third Mahalanobis distance. When the amount of change in the Mahalanobis distance is greater than a predetermined threshold, abnormality determination unit 7 determines that the operational state of the equipment is abnormal.

In the example illustrated in FIG. 15, when the Mahalanobis distance of the time-series data of waveform B is obtained only using the first unit space, the Mahalanobis distances are the same between waveform A having normal variations and waveform B having abnormal variations. Therefore, the abnormal variations in waveform B cannot be detected.

On the other hand, according to the second embodiment, obtaining the Mahalanobis distances using the second and third unit spaces earlier in data collection time than the first unit space shows a difference between the Mahalanobis distance of waveform A and the Mahalanobis distance of waveform B. As described above, obtaining the Mahalanobis distance of the same diagnosis section using a plurality of unit spaces having mutually different data collection times allows abnormal variations due to deterioration over time to be detected based on the amount of change in the Mahalanobis distance.

Third Embodiment

As for the third embodiment, a method for updating a unit space according to the first embodiment will be described.

The unit space is updated by unit space data creating unit 5 (see FIG. 1). Note that the data length and update interval of the unit space applied to the present embodiment correspond to the data length (number of data) and update interval determined by unit space defining unit 4 by the method described in the first embodiment.

Figure 16:
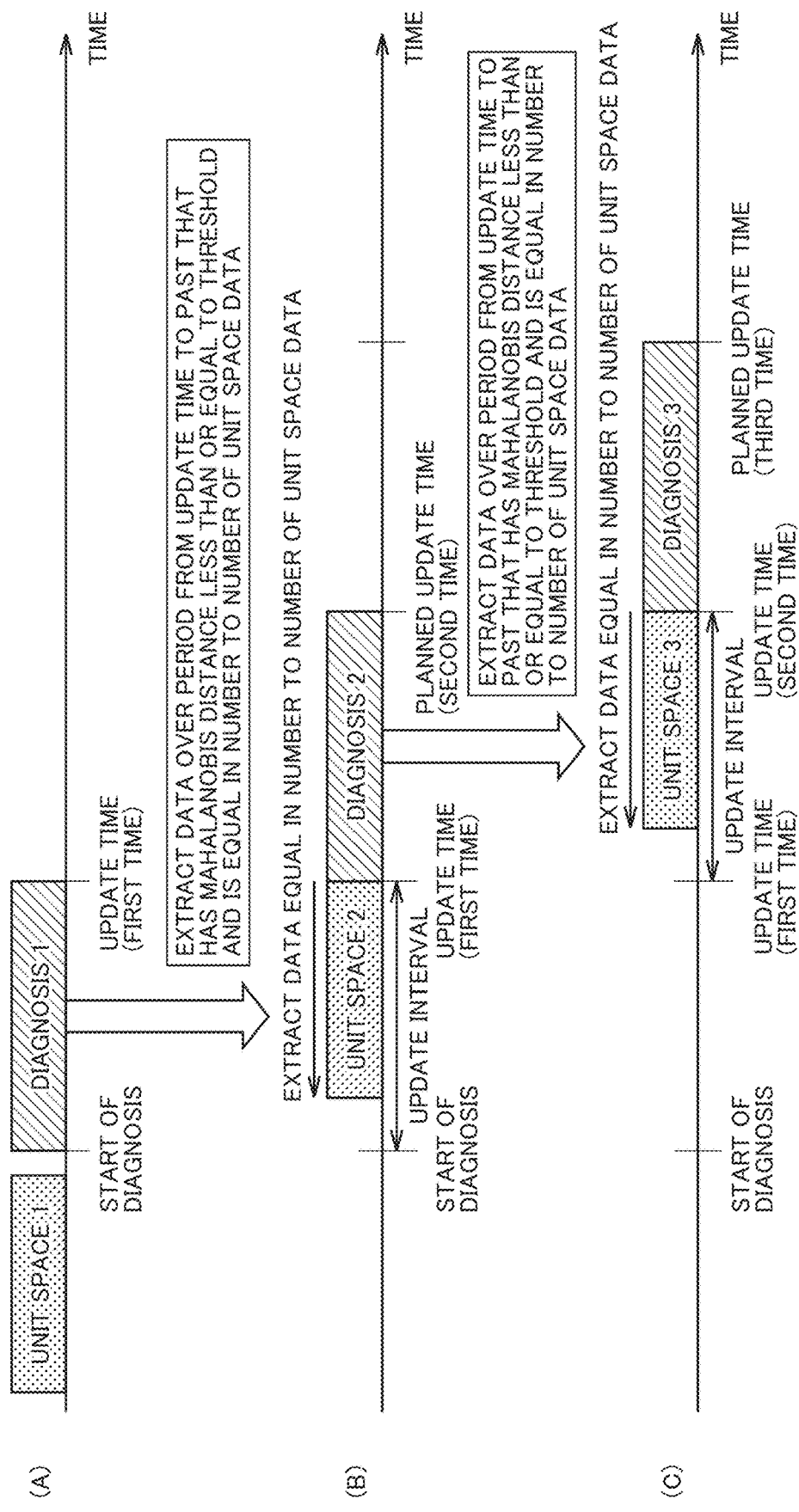
FIG. 16 is a diagram for describing a processing procedure of a method for updating unit space data.

FIG. 16 is a diagram for describing a processing procedure of the method for updating a unit space. FIGS. 16(A) to 16(C) illustrate, in a stepwise manner, a state where unit space is updated each update time after the start of diagnosis.

First, as illustrated in FIG. 16(A), upon the start of diagnosis, diagnosis unit 6 makes a diagnosis over a period from the start of diagnosis to the first update time. The unit space used for the first diagnosis (hereinafter, also referred to as "first unit space") corresponds to normal operation data having the data length (hereinafter, also referred to as "number of unit space data") determined by unit space defining unit 4 and extracted from the read data.

At the first update time after the start of diagnosis, unit space data creating unit discards the first unit space used for the first diagnosis and newly creates a unit space to be used for the second diagnosis (hereinafter, also referred to as "second unit space") after the first update time.

FIG. 16(B) illustrates a method for creating the second unit space. Unit space data creating unit 5 creates the second unit space from data having the Mahalanobis distance less than or equal to the predetermined threshold among data acquired and stored in unit space data storage unit 8 over a period from the start of diagnosis to the first update time. Therefore, all the data making up the first unit space (first unit space data) is discarded and is not used for the second unit space.

Specifically, unit space data creating unit 5 extracts data having the Mahalanobis distance calculated in accordance with the MT system less than or equal to the threshold (that is, determined to be normal) from data existing over a period from the start of diagnosis to the first update time. Further, unit space data creating unit 5 extracts, from the data thus extracted, data that exists over a period from a date and time as close as possible to the first update time (latest date and time) back to the past and is equal in number to the number of unit space data and newly creates the second unit space. Diagnosis unit 6 makes the second diagnosis (after the first update time) using the second unit space.

At the second update time after the start of the second diagnosis, unit space data creating unit 5 discards the second unit space used for the second diagnosis. Then, unit space data creating unit 5 newly creates a unit space to be used for the third diagnosis (hereinafter, also referred to as "third unit space") after the second update time.

FIG. 16(C) illustrates a method for creating the third unit space. Unit space data creating unit 5 creates the third unit space from data having the Mahalanobis distance less than or equal to the predetermined threshold among data acquired and stored in unit space data storage unit 8 over a period from the start of the second diagnosis to the second update time. Therefore, all the data making up the second unit space (second unit space data) is discarded and is not used for the third unit space.

Specifically, unit space data creating unit 5 extracts data having the Mahalanobis distance less than or equal to the threshold (that is, determined to be normal) from data existing over a period from the first update time (the start of the second diagnosis) to the second update time. Further, unit space data creating unit 5 extracts, from the data thus extracted, data that exists over a period from a date and time as close as possible to the second update time (latest date and time) to the past and is equal in number to the number of unit space data and newly creates the third unit space. Diagnosis unit 6 makes the third diagnosis (after the second update time) using the third unit space.

After the start of the third diagnosis, unit space data creating unit 5 repeats the above-described procedure at each update time to periodically update the unit space. Diagnosis unit 6 continues a diagnosis using the unit space that is periodically updated. Therefore, it is desirable that the update interval be longer than equal to the number of unit space data. Further, even when a diagnosis is made using a plurality of unit spaces, each unit space is periodically updated using the same procedure. A diagnosis is made using the plurality of unit spaces thus updated.

As described above, at each update time, a unit space used for a previous diagnosis is discarded to prevent the unit space data (data making up the unit space) used for the past diagnosis from being used again, and a unit space is newly created from data having the Mahalanobis distance less than or equal to the threshold among the latest data acquired from the equipment and is used for a diagnosis after the update time. This allows a diagnosis to be made using the unit space made up of normal data reflecting the latest state of the equipment that is the diagnosis subject and thus allows a diagnosis to be made without erroneous determination.

Fourth Embodiment

The method for updating a unit space described in the third embodiment may bring about a case where data having the Mahalanobis distance less than or equal to the threshold among data acquired and stored in unit space data storage unit 8 over a period from the start of diagnosis to the next update time is less in number than the number of unit space data predetermined by unit space defining unit 4. As for the fourth embodiment, a method for updating a unit space in such a case will be described.

The method for updating a unit space according to the fourth embodiment includes the following first update method and second update method. Unit space data creating unit 5 can select either of the two types of update methods to update the unit space.

(1) First Update Method

Figure 17:
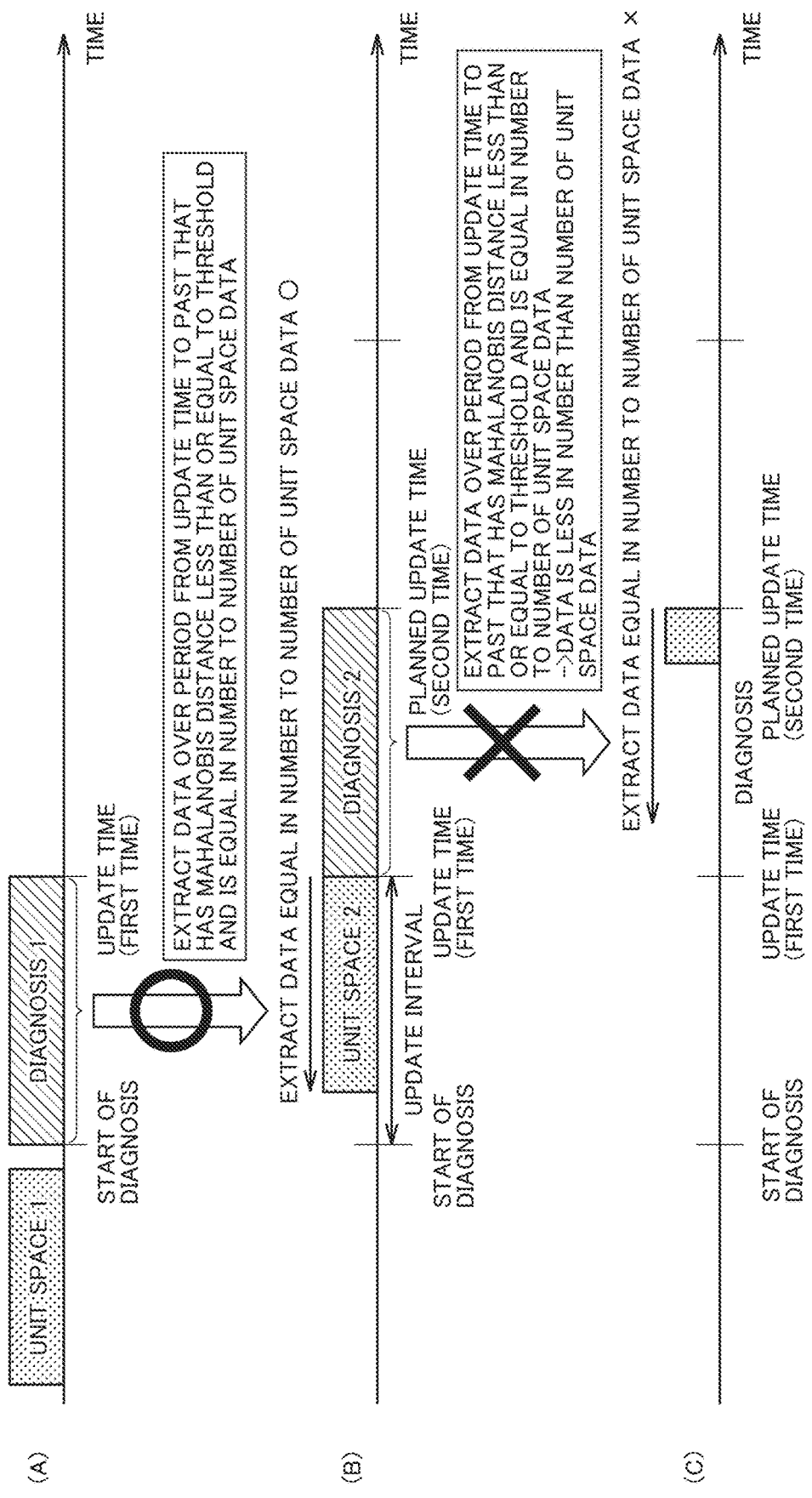
FIG. 17 is a diagram for describing a processing procedure of a first update method for updating unit space data.
Figure 18:
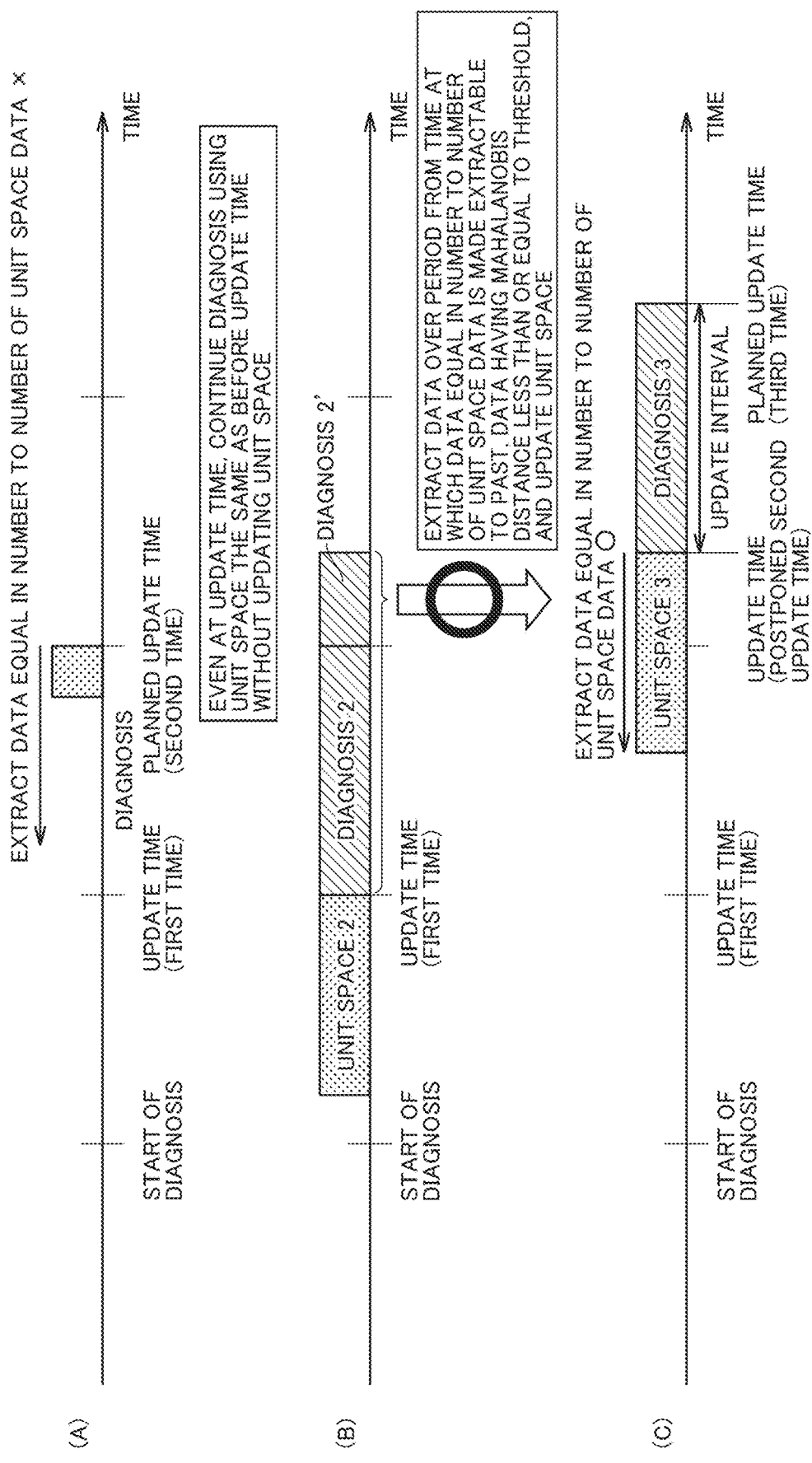
FIG. 18 is a diagram for describing a processing procedure of the first update method for updating unit space data.

FIGS. 17 and 18 are diagrams for describing a processing procedure of the first update method for updating a unit space. FIGS. 17(A) to 17(C) and FIGS. 18(A) to 18(C) illustrate, in a stepwise manner, a state where the unit space is updated each update time after the start of diagnosis.

FIGS. 17 and 18 are different from FIG. 16 in the method for creating the third unit space. Specifically, FIG. 17 illustrates a case where the number of data used for creating the third unit space is less than the number of unit space data. FIG. 18 illustrates a procedure for creating the third unit space in the case illustrated in FIG. 17. Note that FIGS. 17(A) and 17(B) are the same as FIGS. 16(A) and 16(B), and thus no detailed description will be given of FIGS. 17(A) and 17(B).

As illustrated in FIG. 17(C), in order to create the third unit space, unit space data creating unit 5 extracts data having the Mahalanobis distance less than or equal to the threshold (that is, determined to be normal) from data acquired and stored in unit space data storage unit 8 over a period from the start of the second diagnosis to the second update time. Unit space data creating unit 5 further extracts, from the data thus extracted, data that exists over a period from a date and time as close as possible to the second update time (latest date and time) to the past and is equal in number to the predetermined number of unit space data.

When the number of data having the Mahalanobis distance less than or equal to the threshold is less than the number of unit space data, unit space data creating unit 5 does not update the unit space even at the second update time, as illustrated in FIG. 18(A). That is, unit space data creating unit 5 holds the second unit space without newly creating the third unit space. This causes diagnosis unit 6 to make a diagnosis on data after the second update time using the second unit space. This diagnosis is referred to as a second' diagnosis.

During the second' diagnosis, diagnosis unit 6 calculates the Mahalanobis distance using the second unit space and data read by data reading unit 2 after the start of the second' diagnosis and subjected to preprocessing as necessary.

As illustrated in FIG. 18(B), the second' diagnosis is continued until the number of data having the Mahalanobis distance less than or equal to the threshold among data acquired and stored in unit space data storage unit 8 over a period from the start of the second diagnosis to the last diagnosis (a period during which a diagnosis is made using the second unit space, that is, a period during which the second diagnosis and the second' diagnosis are made) becomes equal to the number of unit space data predetermined by unit space defining unit 4. Further, a time at which the number of data having the Mahalanobis distance less than or equal to the threshold becomes equal to the number of unit space data is set as a new update time.

As illustrated in FIG. 18(C), when the number of data having the Mahalanobis distance less than or equal to the threshold among data existing over a period from the start of the second diagnosis to the new update time (the diagnosis section using the second unit space) becomes equal to the number of unit space data, diagnosis unit 6 terminates the second' diagnosis. At this time, unit space data creating unit 5 discards the unit space used for the diagnosis up to the new update time and newly creates, as the third unit space, data having the Mahalanobis distance less than or equal to the threshold from data acquired and stored in unit space data storage unit 8 over a period from the start of the second diagnosis to the last diagnosis (a period during which a diagnosis is made using the second unit space, that is, a period during which the second diagnosis and the second' diagnosis are made). That is, the unit space is updated after the original second update time. Diagnosis unit 6 starts the third diagnosis using the third unit space.

Note that, as illustrated in FIG. 18(C), the count of the update interval after the new update time is reset at the new update time (when the newly created third unit space is applied to a diagnosis). Therefore, unit space data creating unit 5 starts to count the update interval at this time and, at the third update time, newly creates a unit space to be used for the fourth diagnosis (hereinafter, also referred to as "fourth unit space") after the third update time.

Unit space data creating unit 5 switches between the update method described in the third embodiment and the first update method described above according to the number of extracted data and uses the update method to update the unit space in a suitable manner. Diagnosis unit 6 makes a diagnosis continuously using the unit space thus updated. Accordingly, the unit space is created only from the data having the Mahalanobis distance less than or equal to the threshold, so that it is possible to prevent a diagnosis using a unit space containing abnormal data from resulting in erroneous determination. Further, the unit space created in this manner reflects the latest equipment state, so that it is possible to prevent normal variations such as seasonal variations from being erroneously determined to be abnormal.

(2) Second Update Method

Figure 19:
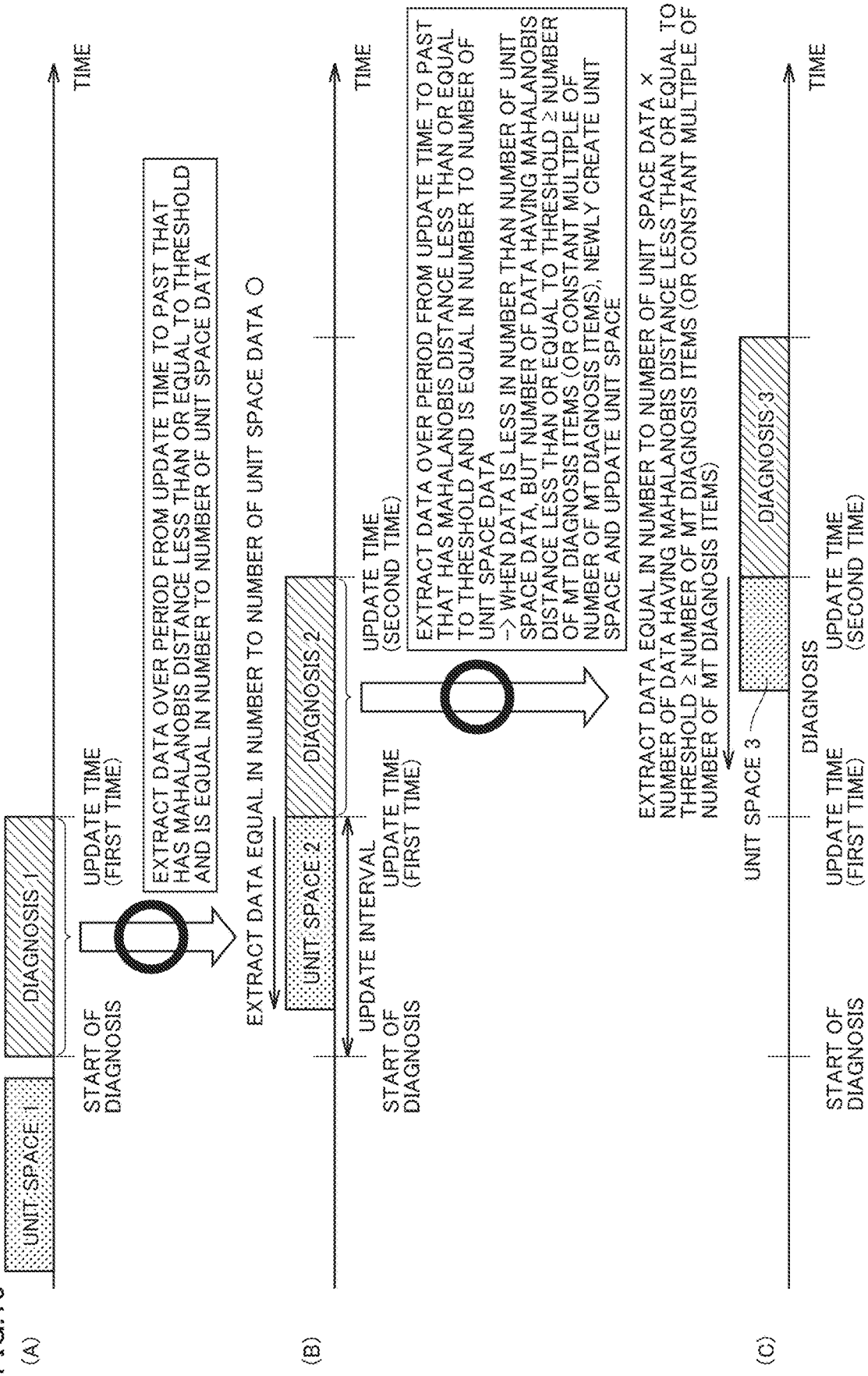
FIG. 19 is a diagram for describing a processing procedure of a second update method for updating unit space data.
Figure 20:
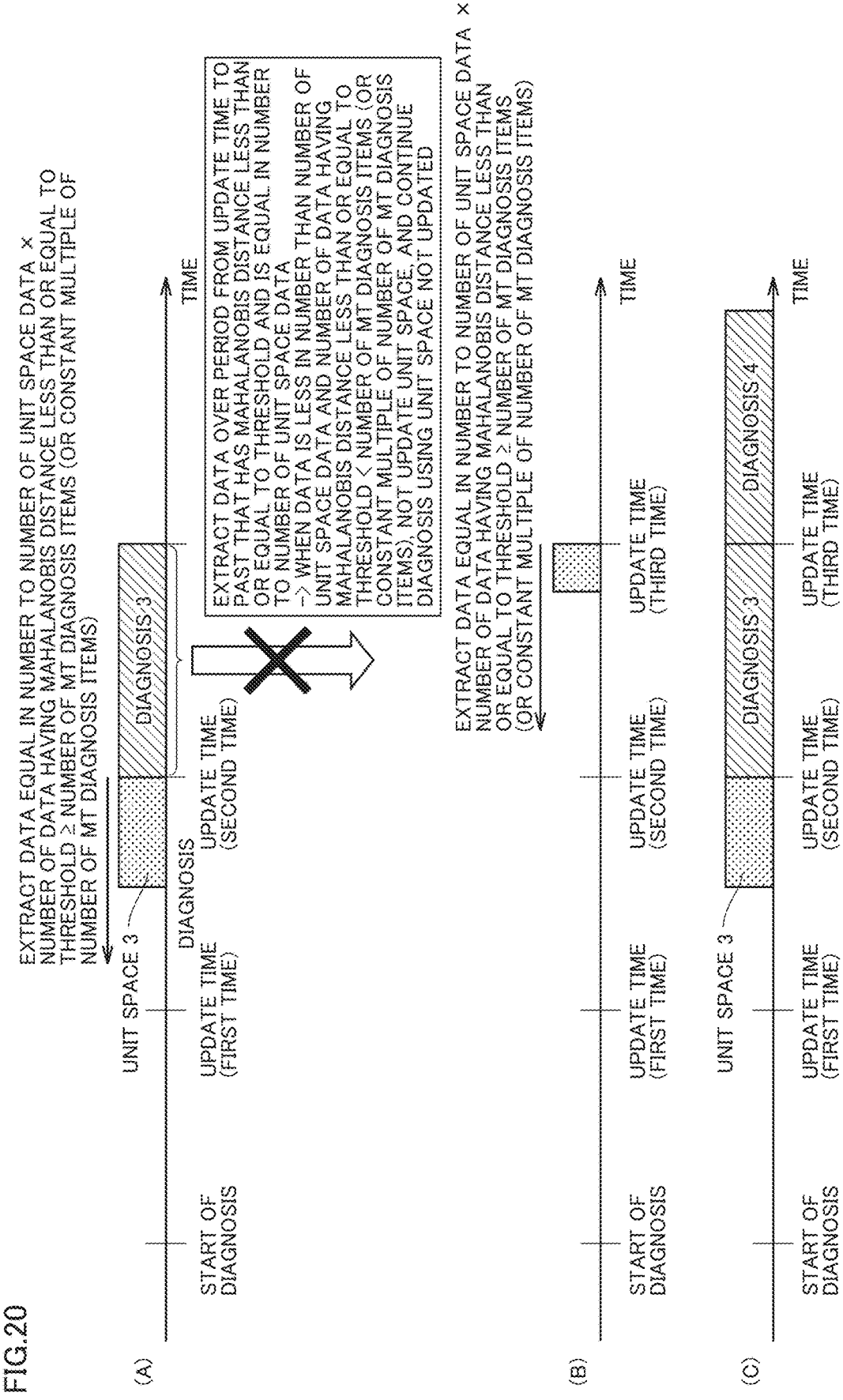
FIG. 20 is a diagram for describing a processing procedure of the second update method for updating unit space data.
Figure 21:
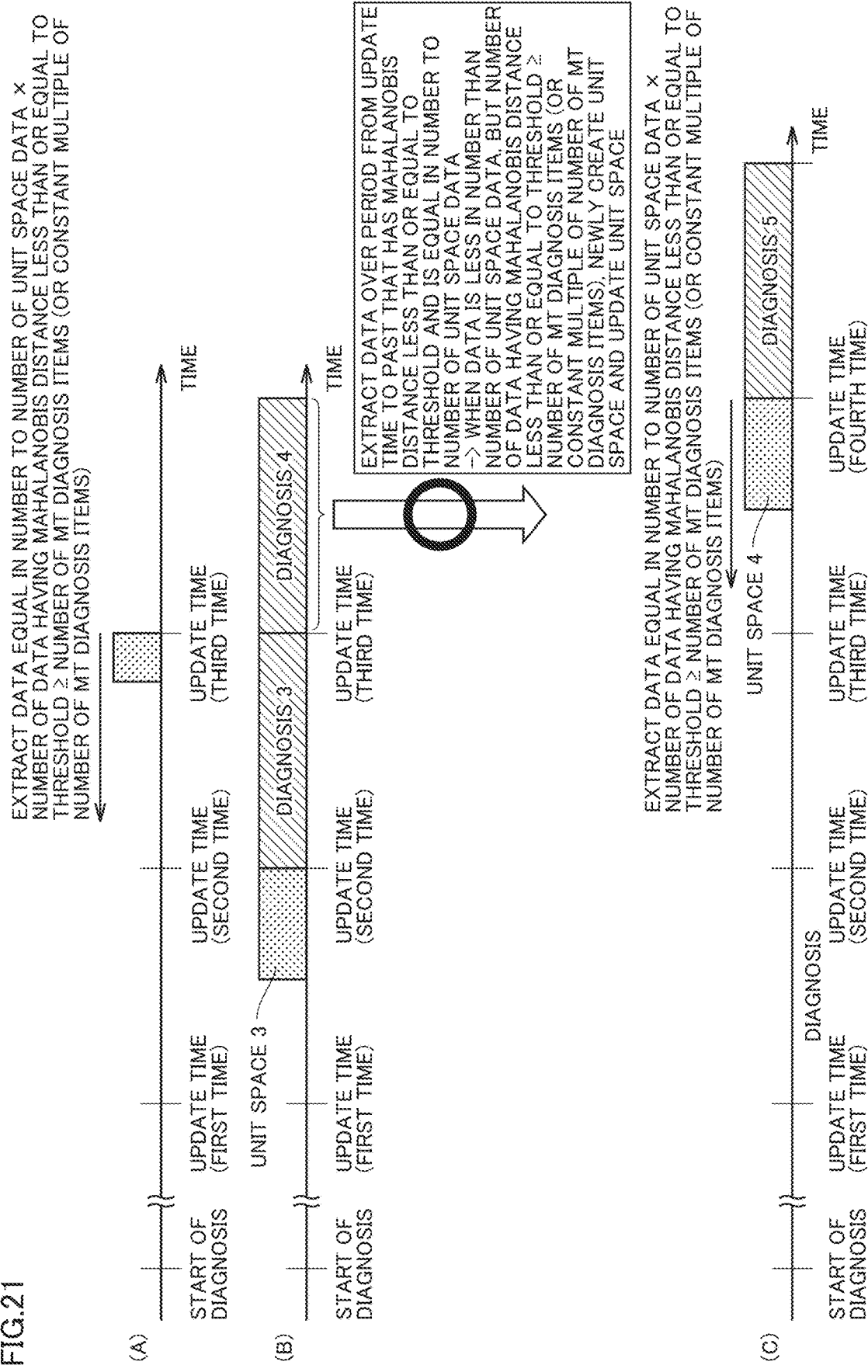
FIG. 21 is a diagram for describing a processing procedure of the second update method for updating unit space data.

FIGS. 19 to 21 are diagrams for describing a processing procedure of the second update method for updating a unit space. FIGS. 19(A) to 19(C), FIGS. 20(A) to 20(C), and FIGS. 21(A) to 21(C) illustrate, in a stepwise manner, a state where the unit space is updated at each update interval after the start of diagnosis.

FIGS. 19 and 20 are different from FIG. 16 in the method for creating the third unit space. Specifically, FIGS. 19 and 20 illustrate a procedure of creating the third unit space applied to a case where the number of data used for creating the third unit space is less than the number of unit space data. Note that FIGS. 19(A) and 19(B) are the same as FIGS. 16(A) and 16(B), and thus no detailed description will be given of FIGS. 19(A) and 19(B).

As illustrated in FIG. 19(C), in order to create the third unit space, unit space data creating unit 5 discards, at the second update time, the unit space used for the previous diagnosis and extracts data having the Mahalanobis distance less than or equal to the threshold (that is, determined to be normal) from data acquired and stored in unit space data storage unit 8 over a period from the start of the second diagnosis to the second update time. Unit space data creating unit 5 further extracts, from the data thus extracted, data that exists over a period from a date and time as close as possible to the second update time (latest date and time) to the past and is equal in number to the predetermined number of unit space data.

The second update method causes, even when the number of data having the Mahalanobis distance less than or equal to the threshold is less than the number of unit space data predetermined by unit space defining unit 4, unit space data creating unit 5 to discard, at the second update time, the unit space used for the previous diagnosis and newly create the third unit space. This causes diagnosis unit 6 to make the third diagnosis using the third unit space after the second update time.

The second update method is applied to a case where a predetermined regular interval is desirably used such as a case where the update interval is determined based on a seasonal variation cycle or the like. In a case where the number of data having the Mahalanobis distance less than or equal to the threshold is less than the number of evaluation items used for calculating the Mahalanobis distance or a constant multiple of the number of evaluation items, however, there is a possibility that an accurate diagnosis cannot be made. Therefore, as illustrated in FIG. 19(C), when the number of data having the Mahalanobis distance less than or equal to the threshold is greater than or equal to the number of evaluation items or a constant multiple of the number of evaluation items, but is less than the predetermined number of unit space data, unit space data creating unit 5 creates the third unit space from the data having the Mahalanobis distance less than or equal to the threshold and uses the third unit space for the third diagnosis.

FIG. 20(A) illustrates a method for creating the fourth unit space. Unit space data creating unit 5 creates the fourth unit space from data having the Mahalanobis distance less than or equal to the threshold among data acquired and stored in unit space data storage unit 8 over a period from the start of the third diagnosis to the third update time.

FIG. 20(A) illustrates a case where the number of data having the Mahalanobis distance less than or equal to the threshold used for creating the fourth unit space is less than the number of unit space data and is less than the number of evaluation items or a constant multiple of the number of evaluation items. In such a case, unit space data creating unit 5 does not update the unit space even at the third update time. That is, as illustrated in FIG. 20(B), unit space data creating unit 5 holds the third unit space without newly creating the fourth unit space. This causes, as illustrated in FIG. 20(C), diagnosis unit 6 to make a diagnosis on data after the third update time using the third unit space. That is, the fourth diagnosis is made using the third unit space.

FIGS. 21(A) to 21(C) illustrate a method for creating the fourth unit space. At the fourth update time after the start of the fourth diagnosis, unit space data creating unit 5 extracts data having the Mahalanobis distance less than or equal to the threshold (that is, determined to be normal) from data acquired and stored in unit space data storage unit 8 over a period from the start of the fourth diagnosis to the fourth update time.

When the number of data having the Mahalanobis distance less than or equal to the threshold is less than the number of unit space data predetermined by unit space defining unit 4, unit space data creating unit 5 determines whether the number of data having the Mahalanobis distance less than or equal to the threshold is greater than or equal to the number of evaluation items used for diagnosis or a constant multiple of the number of evaluation items. When confirming that the number of data having the Mahalanobis distance less than or equal to the threshold is greater than or equal to the number of evaluation items used for diagnosis or a constant multiple of the number of evaluation items, unit space data creating unit 5 newly creates the fourth unit space from the data having the Mahalanobis distance less than or equal to the threshold as illustrated in FIG. 21(B). This causes diagnosis unit 6 to make the fifth diagnosis using the fourth unit space.

Unit space data creating unit 5 switches between the update method described in the third embodiment and the second update method described above according to the number of extracted data and uses the update method to update the unit space in a suitable manner. Diagnosis unit 6 makes a diagnosis continuously using the unit space thus updated. Accordingly, the unit space is created only from the data having the Mahalanobis distance less than or equal to the threshold, so that it is possible to prevent a diagnosis using a unit space containing abnormal data from resulting in erroneous determination. Further, the unit space created in this manner reflects the latest equipment state, so that it is possible to prevent normal variations such as seasonal variations from being erroneously determined to be abnormal. Furthermore, even when periodic normal state variations such as seasonal variations appear, the unit space can be updated at regular intervals, so that erroneous determination can be prevented.

Fifth Embodiment

Figure 22:
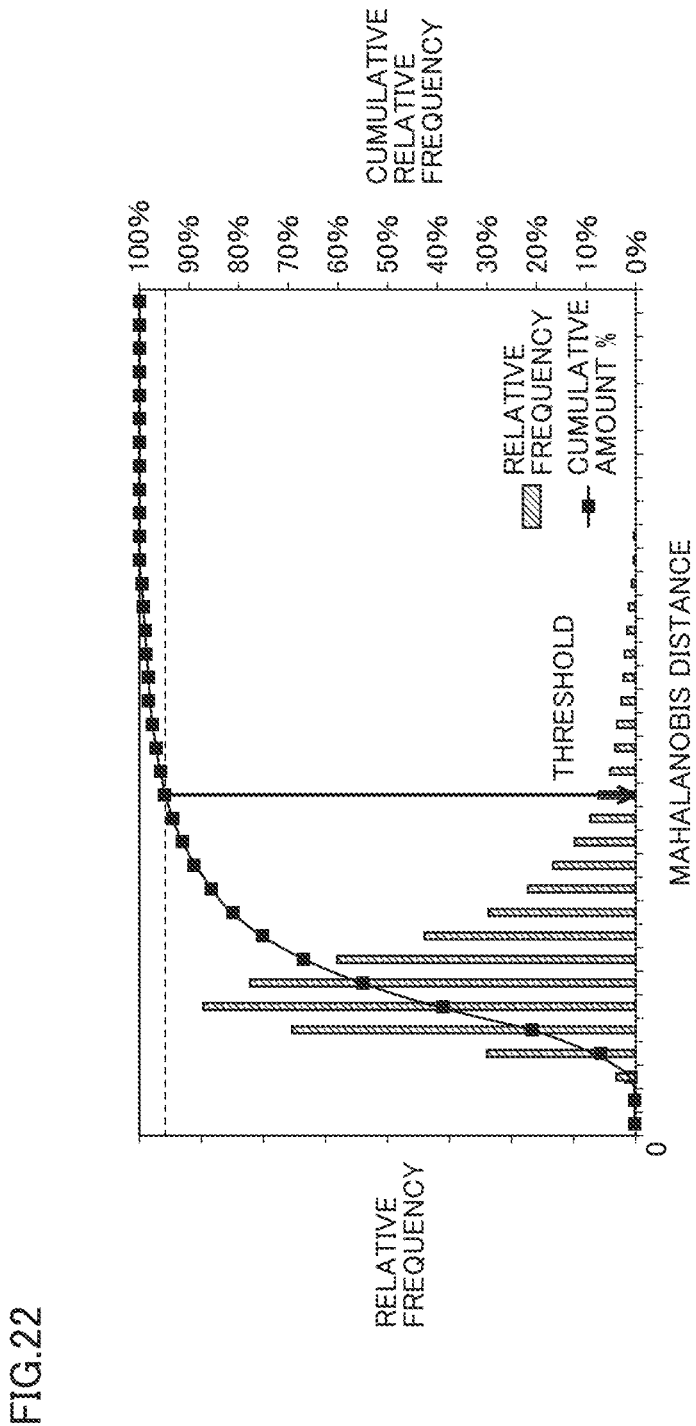
FIG. 22 is a diagram for describing a method for determining a Mahalanobis distance threshold.

As for the fifth embodiment, a method for determining a Mahalanobis distance threshold used for selecting data used for creating a new unit space from among data acquired and stored in unit space data storage unit 8 at the unit space update time will be described. FIG. 22 is a diagram for describing the method for determining the Mahalanobis distance threshold. FIG. 22 illustrates a frequency distribution (histogram) of the Mahalanobis distance. The histogram of FIG. 22 is a histogram of a Mahalanobis distance obtained as a result of making a diagnosis on data existing over any given period that is known to have no abnormality and to be in a normal state. The horizontal axis of the histogram represents a class of the Mahalanobis distance, and the vertical axis represents a relative frequency and cumulative relative frequency of the Mahalanobis distance belonging to each class.

According to the fifth embodiment, a determination value used for determining the Mahalanobis distance threshold is predetermined for the cumulative relative frequency of the Mahalanobis distance. Then, a Mahalanobis distance when the cumulative relative frequency becomes equal to the determination value is determined to be the Mahalanobis distance threshold. In the example illustrated in FIG. 22, the determination value of the cumulative relative frequency is set to 95%. A Mahalanobis distance when the cumulative relative frequency becomes equal to 95% can be determined to be the threshold. As described above, determining the threshold based on the histogram of the Mahalanobis distance obtained from data that is known to be in a normal state makes it possible to determine a threshold most suitable for the equipment or apparatus that is the diagnosis subject and thus makes it possible to prevent erroneous determination.

Note that, the configurations described in each of the plurality of embodiments are originally intended to form, with neither mismatch nor discrepancy, any desired combination including combinations not mentioned herein.

It should be understood that the embodiments disclosed herein are illustrative in all respects and not restrictive. The scope of the present disclosure is defined by the claims rather than the above description and is intended to include the claims, equivalents of the claims, and all modifications within the scope.

REFERENCE SIGNS LIST

1: abnormality diagnosis device, 2: data reading unit, 3: data display unit, 4: unit space defining unit, 5: unit space data creating unit, 6: diagnosis unit, 7: abnormality determination unit, 8: unit space data storage unit, 9: determination result output unit, 10: data length determining unit, 11: update interval determining unit, 20: CPU, 21: ROM, 22: RAM, 23: HDD, 24: communication interface. 25: I/O interface, 26: input unit, 27: display unit

The invention claimed is:

1. An abnormality diagnosis method for diagnosing an abnormality in operational state of an equipment, the abnormality diagnosis method comprising:
    creating a unit space from normal operation data of the equipment, the unit space serving as a reference for determining the operational state of the equipment;
    acquiring data having state quantities of a plurality of evaluation items from the equipment;
    calculating a Mahalanobis distance of the data acquired, using the unit space created;
    determining an abnormality in the operational state of the equipment based on the Mahalanobis distance calculated; and
    outputting time-series changes in the plurality of Mahalanobis distances obtained using the plurality of unit spaces and a result of the determination as to whether the operational state of the equipment is abnormal based on all of the calculated Mahalanobis distances to diagnose the abnormality in the operation state of the equipment, wherein
    the creating the unit space includes creating a plurality of unit spaces having mutually different data lengths,
    the calculating a Mahalanobis distance includes calculating a plurality of Mahalanobis distances using the plurality of unit spaces created,
    the determining an abnormality includes determining an abnormality based on the plurality of Mahalanobis distances calculated.

2. The abnormality diagnosis method according to claim 1, wherein the creating a plurality of unit spaces includes determining a data length of each of the plurality of unit spaces based on at least one of a correlation coefficient between the plurality of evaluation items in the data acquired from the equipment and a normal variation cycle of the data.

3. The abnormality diagnosis method according to claim 1, wherein the calculating a Mahalanobis distance includes calculating a plurality of Mahalanobis distances of the data at a same diagnosis time using the plurality of unit spaces created.

4. The abnormality diagnosis method according to claim 3, wherein the creating a plurality of unit spaces includes determining a data length of each of the plurality of unit spaces based on at least one of a correlation coefficient between the plurality of evaluation items in the data acquired from the equipment and a normal variation cycle of the data.

5. The abnormality diagnosis method according to claim 1, further comprising determining, based on a correlation coefficient between the plurality of evaluation items in the data acquired from the equipment, an update interval of the unit space and periodically updating the unit space.

6. The abnormality diagnosis method according to claim 5, wherein the periodically updating the unit space includes:
    discarding, at each update time based on the update interval after start of diagnosis, all data making up the unit space used for diagnosis up to the update time;
    extracting, at the first update time after the start of diagnosis, data existing over a period from present back to past that has the Mahalanobis distance less than or equal to a threshold and is equal in number to a number of unit space data from the data acquired over a period from the start of diagnosis to the first update time, and newly creating the unit space to be used for diagnosis after the first update time from the data extracted; and
    extracting, at each of the second and subsequent update times after the start of diagnosis, data existing over a period from present back to past that has the Mahalanobis distance less than or equal to the threshold and is equal in number to the number of unit space data from the data acquired over a period from the previous update time to the current update time, and newly creating the unit space to be used for diagnosis after the current update time from the data extracted.

7. The abnormality diagnosis method according to claim 6, further comprising creating a histogram from a Mahalanobis distance obtained for any given period that is known to have no abnormality, and setting, as the threshold, the Mahalanobis distance when a cumulative relative frequency of the histogram becomes equal to a predetermined value.

8. The abnormality diagnosis method according to claim 5, wherein
    the periodically updating the unit space includes:
        extracting, at the first update time based on the update interval after start of diagnosis, data existing over a period from present back to past that has the Mahalanobis distance less than or equal to a threshold from the data acquired over a period from the start of diagnosis to the first update time, and newly creating a first unit space to be used for diagnosis after the first update time from the data extracted; and extracting, at each of the second and subsequent update times after the start of diagnosis, data existing over a period from present back to past that has the Mahalanobis distance less than or equal to the threshold from the data acquired over a period from the previous update time to the current update time, and newly creating a second unit space to be used for diagnosis after the current update time from the data extracted, the newly creating the first unit space includes:
continuing a diagnosis using the unit space the same as before the first update time even after the first update time when data having the Mahalanobis distance less than or equal to the threshold among the data acquired over a period from the start of diagnosis to the first update time is less in number than a number of unit space data at the first update time; and discarding, with a time at which data having the Mahalanobis distance less than or equal to the threshold among the data acquired over a period from the start of diagnosis to the last diagnosis becomes equal in number to the number of unit space data set as a new update time, all data making up the unit space used for diagnosis up to the new update time at the new update time, and creating the first unit space to be used for diagnosis after the new update time from the data having the Mahalanobis distance less than or equal to the threshold among the data acquired over a period from the start of diagnosis to the new update time, and the newly creating the second unit space includes:
continuing a diagnosis using the unit space the same as before the current update time even after the current update time when data having the Mahalanobis distance less than or equal to the threshold among the data acquired over a period from the previous update time to the current update time is less in number than the number of unit space data at the current update time; and discarding, with a time at which data having the Mahalanobis distance less than or equal to the threshold among the data acquired over a period from the previous update time to the last diagnosis becomes equal in number to the number of unit space data set as a new update time, all data making up the unit space used for diagnosis up to the new update time at the new update time, and creating the second unit space to be used for diagnosis after the new update time from the data having the Mahalanobis distance less than or equal to the threshold among the data acquired over a period from the previous update time to the new update time.

9. The abnormality diagnosis method according to claim 5, wherein
the periodically updating the unit space includes:
newly creating, at the first update time based on the update interval after start of diagnosis, a first unit space to be used for diagnosis after the first update time; and
newly creating, at each of the second and subsequent update times after the start of diagnosis, a second unit space to be used for diagnosis after the current update time, the newly creating the first unit space include:
discarding, when data having the Mahalanobis distance less than or equal to the threshold among the data acquired over a period from the start of diagnosis to the first update time is less in number than a number of unit space data and is greater in number than or equal in number to a number of evaluations items used for calculating the Mahalanobis distance, all data making up the unit space used for diagnosis up to the first update time at the first update time, and creating the first unit space to be used for diagnosis after the first update time from the data having the Mahalanobis distance less than or equal to the threshold acquired over a period up to the first update time; and continuing, until the next update time, diagnosis using the unit space the same as before the first update time up to the second update time when data having the Mahalanobis distance less than or equal to the threshold among the data acquired over a period from the start of diagnosis to the first update time is less in number than the number of unit space data and is less in number than the number of evaluations items or a constant multiple of the number of evaluations items, and the newly creating the second unit space include:
discarding, when data having the Mahalanobis distance less than or equal to the threshold among the data acquired over a period from the previous update time to the current update time is less in number than the number of unit space data and is greater in number than or equal in number to the number of evaluations items or the constant multiple of the number of evaluations items, all data making up the unit space used for diagnosis up to the current update time at the current update time, and creating the second unit space to be used for diagnosis after the current update time from the data having the Mahalanobis distance less than or equal to the threshold acquired over a period from the previous update time to the current update time; and continuing, until the next update time, diagnosis using the unit space the same as before the current update time when data having the Mahalanobis distance less than or equal to the threshold among the data acquired over a period from the previous update time to the current update time is less in number than the number of unit space data and is less in number than the number of evaluations items or the constant multiple of the number of evaluations items.

10. The abnormality diagnosis method according to claim 1, further comprising periodically updating the unit space, using at least one of an update interval determined based on a correlation coefficient between the plurality of evaluation items in the data acquired from the equipment and an update interval determined to be a constant multiple of an interval obtained through analysis of a variation cycle of the data.

11. The abnormality diagnosis method according to claim 1, wherein
the creating a unit space includes creating a plurality of unit spaces having mutually different normal operation data collection time rather than the plurality of unit spaces having the mutually different data lengths, and
the determining an abnormality includes determining an abnormality based on an amount of change in the plurality of Mahalanobis distances calculated.

12. An abnormality diagnosis device that diagnoses an abnormality in operational state of an equipment, the abnormality diagnosis device comprising:
    unit space data creating circuitry to create a unit space from normal operation data of the equipment, the unit space serving as a reference for determining the operational state of the equipment;
    data reading circuitry to acquire data having state quantities of a plurality of evaluation items from the equipment;
    diagnosis circuitry to calculate a Mahalanobis distance of the data acquired, using the unit space created;
    abnormality determination circuitry to determine an abnormality in the operational state of the equipment based on the Mahalanobis distance calculated; and
    unit space defining circuitry to define the unit space; and
    output circuitry to output time-series changes in the plurality of Mahalanobis distances obtained using the plurality of unit spaces and a result of the determination as to whether the operational state of the equipment is abnormal based on all of the calculated Mahalanobis distance to diagnose the abnormality in the operation state of the equipment, wherein
    the unit space data creating circuitry creates a plurality of unit spaces having mutually different data lengths,
    the diagnosis circuitry calculates a plurality of Mahalanobis distances using the plurality of unit spaces created, and
    the abnormality determination circuitry determines an abnormality based on the plurality of Mahalanobis distances calculated.

13. The abnormality diagnosis device according to claim 12, wherein the unit space defining circuitry determines a data length of each of the plurality of unit spaces based on at least one of a correlation coefficient between the plurality of evaluation items in the data acquired from the equipment and a normal variation cycle of the data.

14. The abnormality diagnosis device according to claim 12, wherein the diagnosis circuitry calculates a plurality of Mahalanobis distances of the data at a same diagnosis time using the plurality of unit spaces created.

15. The abnormality diagnosis device according to claim 14, wherein the unit space defining circuitry determines a data length of each of the plurality of unit spaces based on at least one of a correlation coefficient between the plurality of evaluation items in the data acquired from the equipment and a normal variation cycle of the data.

16. The abnormality diagnosis device according to claim 12, wherein the unit space data creating circuitry periodically updates the unit space using an update interval determined based on a correlation coefficient between the plurality of evaluation items in the data acquired from the equipment.

17. The abnormality diagnosis device according to claim 16, wherein
    the unit space data creating circuitry discards, at each update time based on the update interval after start of diagnosis, all data making up the unit space used for diagnosis up to the update time;
    extracts, at the first update time after the start of diagnosis, data existing over a period from present back to past that has the Mahalanobis distance less than or equal to a threshold and is equal in number to a number of unit space data from the data acquired over a period from the start of diagnosis to the first update time, and newly creates the unit space to be used for diagnosis after the first update time from the data extracted; and
    extracts, at each of the second and subsequent update times after the start of diagnosis, data existing over a period from present back to past that has the Mahalanobis distance less than or equal to the threshold and is equal in number to the number of unit space data from the data acquired over a period from the previous update time to the current update time, and newly creating the unit space to be used for diagnosis after the current update time from the data extracted.

18. The abnormality diagnosis device according to claim 17, wherein the unit space data creating circuitry creates a histogram from a Mahalanobis distance obtained for any given period that is known to have no abnormality, and sets, as the threshold, the Mahalanobis distance when a cumulative relative frequency of the histogram becomes equal to a predetermined value.

19. The abnormality diagnosis device according to claim 16, wherein
    the unit space data creating circuitry extracts, at the first update time based on the update interval after start of diagnosis, data existing over a period from present back to past that has the Mahalanobis distance less than or equal to a threshold from the data acquired over a period from the start of diagnosis to the first update time, and newly creates a first unit space to be used for diagnosis after the first update time from the data extracted; and
    extracts, at each of the second and subsequent update times after the start of diagnosis, data existing over a period from present back to past that has the Mahalanobis distance less than or equal to the threshold from the data acquired over a period from the previous update time to the current update time, and newly creates a second unit space to be used for diagnosis after the current update time from the data extracted,
    when newly creating the first unit space, the unit space data creating circuitry continues a diagnosis using the unit space the same as before the first update time even after the first update time when data having the Mahalanobis distance less than or equal to the threshold among the data acquired over a period from the start of diagnosis to the first update time is less in number than a number of unit space data at the first update time;
    discards, with a time at which data having the Mahalanobis distance less than or equal to the threshold among the data acquired over a period from the start of diagnosis to the last diagnosis becomes equal in number to the number of unit space data set as a new update time, all data making up the unit space used for diagnosis up to the new update time at the new update time; and
    creates the first unit space to be used for diagnosis after the new update time from the data having the Mahalanobis distance less than or equal to the threshold among the data acquired over a period from the start of diagnosis to the new update time, and
    when newly creating the second unit space, the unit space data creating circuitry continues a diagnosis using the unit space the same as before the current update time even after the current update time when data having the Mahalanobis distance less than or equal to the threshold among the data acquired over a period from the previous update time to the current update time is less in number than the number of unit space data at the current update time;
    discards, with a time at which data having the Mahalanobis distance less than or equal to the threshold among the data acquired over a period from the previous update time to the last diagnosis becomes equal in number to the number of unit space data set as a new update time, all data making up the unit space used for diagnosis up to the new update time at the new update time; and creates the second unit space to be used for diagnosis after the new update time from the data having the Mahalanobis distance less than or equal to the threshold among the data acquired over a period from the previous update time to the new update time.

20. The abnormality diagnosis device according to claim 16, wherein the unit space data creating circuitry newly creates, at the first update time based on the update interval after start of diagnosis, a first unit space to be used for diagnosis after the first update time; and newly creates, at each of the second and subsequent update times after the start of diagnosis, a second unit space to be used for diagnosis after the current update time, wherein when newly creating the first unit space, the unit space data creating circuitry discards, when data having the Mahalanobis distance less than or equal to the threshold among the data acquired over a period from the start of diagnosis to the first update time is less in number than a number of unit space data and is greater in number than or equal in number to a number of evaluations items used for calculating the Mahalanobis distance, all data making up the unit space used for diagnosis up to the first update time at the first update time, and creates the first unit space to be used for diagnosis after the first update time from the data having the Mahalanobis distance less than or equal to the threshold acquired over a period up to the first update time; and continues, until the next update time, diagnosis using the unit space the same as before the first update time up to the second update time when data having the Mahalanobis distance less than or equal to the threshold among the data acquired over a period from the start of diagnosis to the first update time is less in number than the number of unit space data and is less in number than the number of evaluations items or a constant multiple of the number of evaluations items, and when newly creating the second unit space, the unit space data creating circuitry discards, when data having the Mahalanobis distance less than or equal to the threshold among the data acquired over a period from the previous update time to the current update time is less in number than the number of unit space data and is greater in number than or equal in number to the number of evaluations items or the constant multiple of the number of evaluations items, all data making up the unit space used for diagnosis up to the current update time at the current update time, and creates the second unit space to be used for diagnosis after the current update time from the data having the Mahalanobis distance less than or equal to the threshold acquired over a period from the previous update time to the current update time; and continues, until the next update time, diagnosis using the unit space the same as before the current update time when data having the Mahalanobis distance less than or equal to the threshold among the data acquired over a period from the previous update time to the current update time is less in number than the number of unit space data and is less in number than the number of evaluations items or the constant multiple of the number of evaluations items.

21. The abnormality diagnosis device according to claim 12, wherein the unit space data creating circuitry periodically updates the unit space, using at least one of an update interval determined based on a correlation coefficient between the plurality of evaluation items in the data acquired from the equipment and an update interval determined to be a constant multiple of an interval obtained through analysis of a variation cycle of the data.

22. The abnormality diagnosis device according to claim 12, wherein the unit space data creating circuitry creates a plurality of unit spaces having mutually different normal operation data collection times rather than the plurality of unit spaces having the mutually different data lengths, and the abnormality determination circuitry determines an abnormality based on an amount of change in the plurality of Mahalanobis distances calculated.

23. A non-transitory computer readable storage medium storing an abnormality diagnosis program for causing a computer to execute a process of diagnosing an abnormality in operational state of an equipment, the process comprising:

creating a unit space from normal operation data of the equipment, the unit space serving as a reference for determining the operational state of the equipment;

acquiring data having state quantities of a plurality of evaluation items from the equipment;

calculating a Mahalanobis distance of the data acquired, using the unit space created;

determining an abnormality in the operational state of the equipment based on the Mahalanobis distance calculated; and outputting time-series changes in the plurality of Mahalanobis distances obtained using the plurality of unit spaces and a result of the determination as to whether the operational state of the equipment is abnormal based on all of the calculated Mahalanobis distances to diagnose the abnormality in the operation state of the equipment, wherein the creating a unit space includes creating a plurality of unit spaces having mutually different data lengths, the calculating a Mahalanobis distance includes calculating a plurality of Mahalanobis distances using the plurality of unit spaces created, and the determining an abnormality includes determining an abnormality based on the plurality of Mahalanobis distances calculated.

24. The non-transitory computer readable storage medium according to claim 23, wherein the creating a plurality of unit spaces includes determining a data length of each of the plurality of unit spaces based on at least one of a correlation coefficient between the plurality of evaluation items in the data acquired from the equipment and a normal variation cycle of the data.

25. The non-transitory computer readable storage medium according to claim 23, wherein the calculating a Mahalanobis distance includes calculating a plurality of Mahalanobis distances of the data at a same diagnosis time using the plurality of unit spaces created.

26. The non-transitory computer readable storage medium according to claim 25, wherein the creating a plurality of unit spaces includes determining a data length of each of the plurality of unit spaces based on at least one of a correlation coefficient between the plurality of evaluation items in the data acquired from the equipment and a normal variation cycle of the data.

27. The non-transitory computer readable storage medium according to claim 23, for causing a computer to further execute determining, based on a correlation coefficient between the plurality of evaluation items in the data acquired from the equipment, an update interval of the unit space and periodically updating the unit space.

28. The non-transitory computer readable storage medium according to claim 27, wherein the periodically updating the unit space includes:
    discarding, at each update time based on the update interval after start of diagnosis, all data making up the unit space used for diagnosis up to the update time;
    extracting, at the first update time after the start of diagnosis, data existing over a period from present back to past that has the Mahalanobis distance less than or equal to a threshold and is equal in number to a number of unit space data from the data acquired over a period from the start of diagnosis to the first update time, and newly creating the unit space to be used for diagnosis after the first update time from the data extracted; and
    extracting, at each of the second and subsequent update times after the start of diagnosis, data existing over a period from present back to past that has the Mahalanobis distance less than or equal to the threshold and is equal in number to the number of unit space data from the data acquired over a period from the previous update time to the current update time, and newly creating the unit space to be used for diagnosis after the current update time from the data extracted.

29. The non-transitory computer readable storage medium according to claim 28, the process further comprising creating a histogram from a Mahalanobis distance obtained for any given period that is known to have no abnormality, and setting, as the threshold, the Mahalanobis distance when a cumulative relative frequency of the histogram becomes equal to a predetermined value.

30. The non-transitory computer readable storage medium according to claim 27, wherein
    the periodically updating the unit space includes:
        extracting, at the first update time based on the update interval after start of diagnosis, data existing over a period from present back to past that has the Mahalanobis distance less than or equal to a threshold from the data acquired over a period from the start of diagnosis to the first update time, and newly creating a first unit space to be used for diagnosis after the first update time from the data extracted; and
        extracting, at each of the second and subsequent update times after the start of diagnosis, data existing over a period from present back to past that has the Mahalanobis distance less than or equal to the threshold from the data acquired over a period from the previous update time to the current update time, and newly creating a second unit space to be used for diagnosis after the current update time from the data extracted,
    the newly creating the first unit space includes:
        continuing a diagnosis using the unit space the same as before the first update time even after the first update time when data having the Mahalanobis distance less than or equal to the threshold among the data acquired over a period from the start of diagnosis to the first update time is less in number than a number of unit space data at the first update time; and
        discarding, with a time at which data having the Mahalanobis distance less than or equal to the threshold among the data acquired over a period from the start of diagnosis to the last diagnosis becomes equal in number to the number of unit space data set as a new update time, all data making up the unit space used for diagnosis up to the new update time at the new update time, and creating the first unit space to be used for diagnosis after the new update time from the data having the Mahalanobis distance less than or equal to the threshold among the data acquired over a period from the start of diagnosis to the new update time, and
    the newly creating the second unit space includes:
        continuing a diagnosis using the unit space the same as before the current update time even after the current update time when data having the Mahalanobis distance less than or equal to the threshold among the data acquired over a period from the previous update time to the current update time is less in number than the number of unit space data at the current update time; and
        discarding, with a time at which data having the Mahalanobis distance less than or equal to the threshold among the data acquired over a period from the previous update time to the last diagnosis becomes equal in number to the number of unit space data set as a new update time, all data making up the unit space used for diagnosis up to the new update time at the new update time, and creating the second unit space to be used for diagnosis after the new update time from the data having the Mahalanobis distance less than or equal to the threshold among the data acquired over a period from the previous update time to the new update time.

31. The non-transitory computer readable storage medium according to claim 27, wherein
    the periodically updating the unit space includes:
        newly creating, at the first update time based on the update interval after start of diagnosis, a first unit space to be used for diagnosis after the first update time; and
        newly creating, at each of the second and subsequent update times after the start of diagnosis, a second unit space to be used for diagnosis after the current update time,
    the newly creating the first unit space include:
        discarding, when data having the Mahalanobis distance less than or equal to the threshold among the data acquired over a period from the start of diagnosis to the first update time is less in number than a number of unit space data and is greater in number than or equal in number to a number of evaluations items used for calculating the Mahalanobis distance, all data making up the unit space used for diagnosis up to the first update time at the first update time, and creating the first unit space to be used for diagnosis after the first update time from the data having the Mahalanobis distance less than or equal to the threshold acquired over a period up to the first update time; and
        continuing, until the next update time, diagnosis using the unit space the same as before the first update time up to the second update time when data having the Mahalanobis distance less than or equal to the threshold among the data acquired over a period from the start of diagnosis to the first update time is less in number than the number of unit space data and is less in number than the number of evaluations items or a constant multiple of the number of evaluations items, and the newly creating the second unit space include:

discarding, when data having the Mahalanobis distance less than or equal to the threshold among the data acquired over a period from the previous update time to the current update time is less in number than the number of unit space data and is greater in number than or equal in number to the number of evaluations items or the constant multiple of the number of evaluations items, all data making up the unit space used for diagnosis up to the current update time at the current update time, and creating the second unit space to be used for diagnosis after the current update time from the data having the Mahalanobis distance less than or equal to the threshold acquired over a period from the previous update time to the current update time; and continuing, until the next update time, diagnosis using the unit space the same as before the current update time when data having the Mahalanobis distance less than or equal to the threshold among the data acquired over a period from the previous update time to the current update time is less in number than the number of unit space data and is less in number than the number of evaluations items or the constant multiple of the number of evaluations items.

32. The non-transitory computer readable storage medium according to claim 23, for causing a computer to further execute periodically updating the unit space, using at least one of an update interval determined based on a correlation coefficient between the plurality of evaluation items in the data acquired from the equipment and an update interval determined to be a constant multiple of an interval obtained through analysis of a variation cycle of the data.

33. The non-transitory computer readable storage medium according to claim 23, wherein the creating a unit space includes creating a plurality of unit spaces having mutually different normal operation data collection times rather than the plurality of unit spaces having the mutually different data lengths, and the determining an abnormality includes determining an abnormality based on an amount of change in the plurality of Mahalanobis distances calculated.

* * * * *